(12) United States Patent
Bukowski et al.

(10) Patent No.: US 7,373,473 B2
(45) Date of Patent: May 13, 2008

(54) SYSTEM AND METHOD FOR EFFICIENT STORAGE AND MANIPULATION OF EXTREMELY LARGE AMOUNTS OF SCAN DATA

(75) Inventors: Richard William Bukowski, Orinda, CA (US); Mark Damon Wheeler, Oakland, CA (US); Laura Michele Downs, Orinda, CA (US); Jonathan Apollo Kung, Oakland, CA (US)

(73) Assignee: Leica Geosystems HDS LLC, San Ramon, CA (US)

( * ) Notice: Subject to any disclaimer, the term of this patent is extended or adjusted under 35 U.S.C. 154(b) by 618 days.

(21) Appl. No.: 11/076,220

(22) Filed: Mar. 9, 2005

(65) Prior Publication Data

US 2005/0203930 A1   Sep. 15, 2005

Related U.S. Application Data

(60) Provisional application No. 60/552,045, filed on Mar. 10, 2004.

(51) Int. Cl.
*G06F 12/02* (2006.01)
(52) U.S. Cl. .................. 711/170; 711/173; 701/201; 701/202; 707/104.1
(58) Field of Classification Search ............. 711/170, 711/173; 701/201, 202; 707/205, 104.1
See application file for complete search history.

(56) References Cited

U.S. PATENT DOCUMENTS

| | | | |
|---|---|---|---|
| 6,125,367 A * | 9/2000 | NA ................. | 707/104.1 |
| 6,771,840 B1 | 8/2004 | Ioannou et al. ........ | 382/285 |
| 7,076,409 B2 * | 7/2006 | Agrawala et al. ...... | 701/201 |
| 2001/0040573 A1 | 11/2001 | Kressin ................ | 345/421 |
| 2003/0067461 A1 | 4/2003 | Fletcher et al. ........ | 345/420 |

OTHER PUBLICATIONS

Ying et al., "An Analystical Approach to Floorplanning for Hierarchical Building Blocks Layout", IEEE Transactions on Computer-Aided Design, vol. 8, No. 4, Apr. 1989, pp. 403-412.*

Hirsch, Stephen A. An Algorithm for Automatic Name Placement Around Point Data. The American Cartographer, vol. 9, No. 1, 1982, pp. 5-17.*

(Continued)

*Primary Examiner*—Pierre-Michel Bataille
(74) *Attorney, Agent, or Firm*—Workman Nydegger

(57) ABSTRACT

Large data sets can be stored and processed in real time by combining and registering the large data sets into a single data set. The data can be stored in a data tree structure formed of layers of spatially organized blocks of data. Such storage allows portions of the data to be viewed efficiently, displaying actual point data at an acceptable resolution for the viewing mechanism. Density limited queries can be executed that allow sub-sampling to be done directly and evenly without geometric constraint, to provide a subset of points that is limited in size and includes a spatially-even decomposition of that set of points. This allows the system as a whole to support arbitrarily large point sets while allowing full partitioning functionality, which is efficient to use in both time and space.

46 Claims, 13 Drawing Sheets

OTHER PUBLICATIONS

Douglas et al., Dec. 1973, "Algorithims for the Reduction of the Number of Points Required to Reresent a Digitized Line or its Caricature," *The Canadian Cartographer*, vol. 10, No. 2, pp. 112-122.*

Sarnet, "Applications of Spatial Data Structures," Computer Graphics, Image Processing, and GIS, pp. 1-9.*

Carla Nardinocchi et al., "Building extraction from LIDAR data, " *IEEE/ISPRS, Joint Workshop on Remote Sensing and Data Fusion over Urban Areas*, Nov. 8-9, 2001, Piscataway, NJ, USA, IEEE, Nov. 8, 2001, pp. 79-83.

Marc Alexa et al., "Point Set Surfaces," *Proceedings Visualization 2001* (Cat. No. 01CH37269), *IEEE*, Piscataway, NJ, USA, (2001), pp. 21-28.

Ravi Ramamoorthi et al., "Creating Generative Models from Range Images," *Computer Graphics Proceedings, Annual Conference Series*, 1999, Aug. 1999, pp. 195-204.

Martin A. Fischler et al., "Random Sample Consensus: A Paradigm for Model Fitting with Applications to Image Analysis and Automated Cartography," *Communications of the ACM*, Jun. 1981, vol. 24, No. 6, pp. 381-395.

Paul J. Besl et al., "Invariant Surface Characteristics for 3D Object Recognition in Range Images," *Computer Vision, Graphics, and Image Processing*, (1986), vol. 33, pp. 33-80.

Adam Hoover et al., "An Experimental Comparison of Range Image Segmentation Algorithms," *IEEE Transactions on Pattern Analysis and Machine Intelligence*, Jul. 1996, vol. 18, No. 7, pp. 673-689.

Jianbo Shi et al., "Normalized Cuts and Image Segmentation," *IEEE Transactions on Pattern Analysis and Machine Intelligence*, Aug. 2000, vol. 22, No. 8, pp. 888-905.

\* cited by examiner

| Global Index | |
|---|---|
| 0: | 0 |
| 1: | 1-7 |
| 2: | 8-20 |
| 3: | 21-50 |
| 4: | 51-100 |
| 5: | 101-200 |
| 6: | 201-280 |
| 7: | 281-360 |
| 8: | 361-440 |
| 9: | 441-520 |
| 10: | 521-590 |
| 11: | 591-600 |

$h = 250$

|  | New | Overlap | Total |
|---|---|---|---|
| A: | 200 | 0 | 200 |
| B: | 20 | 5 | 25 |
| C: | 30 | 5 | 35 |
| D: | 190 | 15 | 205 |
| E: | 150 | 30 | 180 |
| F: | 10 | 5 | 15 |
| Avg.: | 100 | 10 | 110 |

$h = 250$

|  | New | Overlap | Total |
|---|---|---|---|
| A: | 250 | 0 | 250 |
| D: | 190 | 15 | 205 |
| E: | 160 | 30 | 190 |
| Avg.: | 200 | 15 | 215 |

SYSTEM AND METHOD FOR EFFICIENT STORAGE AND MANIPULATION OF EXTREMELY LARGE AMOUNTS OF SCAN DATA

CLAIM OF PRIORITY

This application claims priority to U.S. Provisional Patent Application No. 60/552,045, entitled "SYSTEM AND METHOD FOR EFFICIENT STORAGE AND MANIPULATION OF EXTREMELY LARGE AMOUNTS OF SCAN DATA," filed Mar. 10, 2004, which is hereby incorporated herein by reference.

TECHNICAL FIELD OF THE INVENTION

The present invention relates to the manipulation and processing of large quantities of data, such as the generation of virtual models using three-dimensional data captured of real-world objects.

BACKGROUND

The acquisition of data and subsequent generation of computer models for real-world objects is of interest in many industries, for applications including architecture, physical plant design, entertainment applications (e.g., in movies and games), surveying, manufacturing quality control, medical imaging, and construction, as well as cartography and geography applications. In order to obtain accurate models of an object, as well as the area in which that object exists in the real world, it is necessary to take accurate measurements or samplings of surfaces that make up the object and any elements of the surrounding area. Historically, this sampling was carried out by surveyors, photogrammetrists, or technicians using techniques that provided samples at the rate of tens or hundreds per hour at most. Since the amount of data was relatively small, the data was easily dealt with in standard, off-the-shelf CAD programs or other modeling software.

Recent advances in technology such as LIDAR scanning technologies have resulted in the ability to collect billions of point samples on physical surfaces, over large areas, in a matter of hours. In a LIDAR process, a laser beam scans across a view that encompasses the structure of interest. The scanning device measures a large number of points that lie on surfaces visible in the scene. Each scan point has a measured location in 3D space, to within some measurement error, that typically is recorded relative to a point (x,y,z) in the local coordinate system of the scanner. The resulting collection of points is often referred to as one or more point clouds, where each point cloud can include points that lie on many different surfaces in the scanned view.

LIDAR systems are described, for example, in U.S. Pat. No. 5,988,862, filed Apr. 24, 1996, entitled "INTEGRATED SYSTEM FOR QUICKLY AND ACCURATELY IMAGING AND MODELING THREE DIMENSIONAL OBJECTS," which is hereby incorporated herein by reference. An exemplary LIDAR system 100 shown in FIG. 1 utilizes a Field Digital Vision (FDV) module 102 that includes a scanning sensor for scanning an object 104, such as a building of a piece of machinery. The scanning sensor also can sense the position in three-dimensional space of selected points on the surface of the object 104. The FDV module 102 generates a point cloud 106 that represents the sensed positions of the selected points. The point cloud 106 also can represent other attributes of the sensed positions, such as reflectivity, surface color, and texture, where desired.

A control and processing station 108 interacts with the FDV 102 to provide control and targeting functions for the scanning sensor. In addition, the processing and control station 108 can utilize software to analyze groups of points in the point cloud 106 to generate a model of the object of interest 104. A user interface 116 allows a user to interact with the system, such as to view a two-dimensional (2D) representation of the three-dimensional (3D) point cloud, or to select a portion of that object to be viewed in higher detail as discussed elsewhere herein. The processing station can include any appropriate components, such as standard computer and/or processing components. The processing station also can have computer code in resident memory, on a local hard drive, or in a removable drive or other memory device, which can be programmed to the processing station or obtained from a computer program product such as a CD-ROM or download signal. The computer code can include instructions for interacting with the FDV and/or a user, and can include instructions for undertaking and completing any modeling and/or scanning process discussed, described, or suggested herein.

The FDV 102 can include a scanning laser system (LIDAR) 110 capable of scanning points of the object 104, and that generates a LIDAR data signal that precisely represents the position in 3D space of each scanned point. The LIDAR data signal for the groups of scanned points can collectively constitute the point cloud 106. In addition, a video system 112 can be provided, which in one embodiment includes both wide angle and narrow angle CCD cameras. The wide angle CCD camera can acquire a video image of the object 104 and provides to the control and processing station 108, through a control/interface module 114, a signal that represents the acquired video image.

The acquired video image can be displayed to a user through a user interface 116 of the control and processing station 108. Through the user interface 116, the user can select a portion of the image containing an object to be scanned. In response to user input, the control and processing station can provide a scanning control signal to the LIDAR 110 for controlling the portion of the surface of the object that should be scanned by the LIDAR. More particularly, the scanning control signal can be used to control an accurate and repeatable beam steering mechanism that steers a laser beam of the LIDAR 110. The narrow angle CCD camera of the video system 112 can capture the intensity of the laser returned from each laser impingement point, along with any desired texture and color information, and can provide this captured information to the control and processing station 108. The control and processing station can include a data processing system (e.g., a notebook computer or a graphics workstation) having special purpose software that, when executed, instructs the data processing system to perform the FDV 102 control and targeting functions, and also to perform the model generation functions discussed elsewhere herein. Once the object has been scanned and the data transferred to the control and processing station, the data and/or instructions relating to the data can be displayed to the user. Alternatively, the user can select instructions before or during the LIDAR scan. If multiple scans are taken, these data sets can be registered to form a single data set, for a total number of points less than about 40 million for current technology, or can be registered but left as separate data sets for point sets larger than 40 million points, in order to allow the data to be loaded into a computer for processing and/or analysis. Current computer systems can only handle about 10 million points efficiently, but can handle up to about 40 million points inefficiently through compression techniques. Large octrees can be used in volumetric representations to store an approximation of the actual scan points, but the actual scan points are not available for processing. This simplification of the data can result in a loss of information and/or accuracy, and can cause problems when attempting to query the data.

Current scanning technologies can achieve sampling rates of up to 1 million points per second, with an accuracy of a few millimeters. While these advances can greatly increase the accuracy and complexity of the generated models, the advances also come with problems such as how to store, visualize, manipulate, and/or extract models and measurements from very large amounts of data, particularly where the vast amount of data cannot simply be loaded into computer memory, measured, partitioned, and modeled. For instance, individual data sets used to contain less than a million points but now can contain over 200 million points. Further, instead of tens of scans being taken of a physical object or structure it is now common to have on the order of 300-400 scans, greatly increasing the amount of data to be processed. Aggregate sample sets then can have tens of billions of data points. Current software can only compose data sets up to about 40 million points. For larger scans or data sets, the data is left uncomposed, or is reprocessed off-line into pieces no larger than about 40 million points, so that individual pieces can be worked with separately. The inability to easily process the data as a coherent whole is further complicated by the fact that data acquired by such scanners must undergo a series of processing steps to be used meaningfully, including the capture, registration, and fitting of the data.

The need for multiple data sets arises from the fact that most sensors providing the samples can only measure or detect a portion of the desired scan area from a given position. This is analogous to trying to get a full view of a three dimensional object with a camera. If the object can be moved, then a number of pictures must be taken from the single camera location in order to capture the entire object. If the object cannot be moved, the user must take multiple pictures from several different angles in order to have all of the surfaces of the object appear in at least one picture. Similarly, with sensor applications such as LIDAR applications, the sensor must often be moved to multiple locations in order to sample all sides or surfaces in a given target area. Since the various positions of the sensor generally are not known to any degree of certainty, it is necessary to determine how the sets of sensor samples from each position relate to each other. Without the proper relation information, it is impossible to generate a full sample set forming a coherent model of the entire object. In order to relate the data sets, a registration process must be undergone. Registering the data from multiple views is difficult and time consuming, in part because known techniques for registering sets of samples to each other do not work well on huge sample sets. Further, registration often requires intelligent decimation of those sets before the registration can take place. Existing systems cannot rapidly compute those intelligent decimations to accelerate registration operations.

Once the data sets are registered, it would be most efficient for the user be able to consider the samples to be in the same coordinate system and work with the data as a single, coherent whole. Unfortunately, the combination of many sample sets is often massive in size, and existing software packages still leave the individual sample sets separate in order to keep the size of any given set manageable. This separation leads to difficulty in measurement and fitting operations, as the user must manually cut and recombine small pieces of the sample sets together before being able to perform operations on the desired data segments. Further, managing the hundreds of data sets that are captured using existing systems can be overwhelming, particularly where each individual set is larger than can fit in memory. The size of the data sets can be addressed somewhat through existing data compression techniques (which presently can compress a data set by about 10%), but attempting to do data compression for a set containing 40 million data points, for example, can cause problems with system stability.

Another function which is problematic in existing systems is the partitioning of large data sets into smaller, coherent parts, typically referred to as data subsets. Users presently need to create subsets in order to do operations such as fitting. For example, the points corresponding to a pipe in a plant must sometimes be partitioned out from the rest of the data points for the plant in order to allow a geometric fit, or to copy the points for the pipe to another model in order to perform more detailed operations. Existing systems cannot efficiently support subset operations on large data sets, as these systems must do work proportional to the size of the components being cut in order to make that cut, then require space proportional to the size of the subset in order to store that subset.

DETAILED DESCRIPTION

Figure 1:
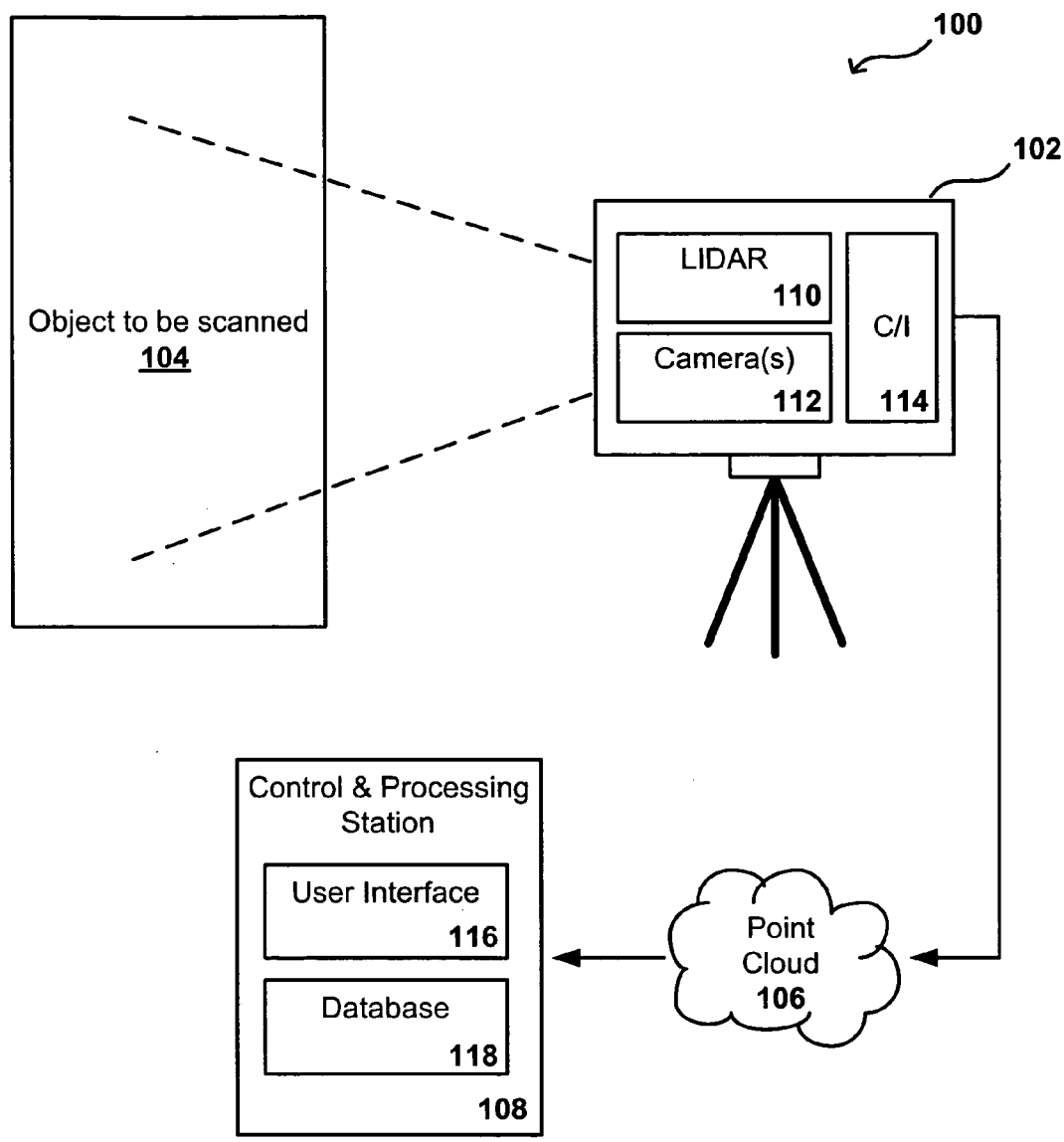
FIG. 1 is a diagram of a scanning LIDAR system that can be used to capture point data for use in accordance with one embodiment of the present invention.

Systems and methods in accordance with embodiments of the present invention can overcome deficiencies in prior art data analysis techniques by changing the way in which the data is organized, stored, retrieved, and/or processed. In one embodiment, an exemplary system is designed to organize extremely large quantities of three-dimensional (3D) scan data. This system allows useful measurements to be taken and/or models to be constructed in an efficient manner, using actual point data, where the set of point data is too large to fit into the available memory of a computer or other data processing device. In this embodiment, the data points are partitioned into separately addressable blocks of data, which then can be organized by spatial density and area or region of space, both within the block and between blocks. Using such an organization of data, the system can build the required data structure at least partially "on the fly," as the data is being acquired, such that the user has a reduced waiting time between the completion of the acquisition process and the readiness of the system to begin registration, measurement, and/or modeling operations. A number of different operations and approaches can be used with the various embodiments described herein.

Since each scan is self-contained, each scan can be processed into the internal representation through a construction process that partitions the data from that scan into blocks, creates the organizational structure and auxiliary information, and writes the representation to the database. In order to set up the database, the data can be sorted as the data comes in and can be written to disk. The loading and sorting of data into the database can be a separate phase executed after each scan. In a registration process, queries can be used that allow for the efficient use of algorithms that read from the organizational structure information in the database and relate these scans to each other, providing for a registration of the data. Once all the data has been captured and registered, the construction process can be applied again to create a single, large, queryable instance of this data structure, which contains all the registered data from the various scans. This unified set can be quite large, with no practical limit on the size of the set. A process workflow could go through a series of scan and sort operations to generate the data structures, then the data structures could be used to generate a single sorted structure that contains all of the data. The single coherent set can provide unprecedented efficiency in manipulating the results of registrations, as well as saving time and effort in the measurement and/or extraction phases. Such an approach can be used to compose an arbitrary number of points.

Because the data is organized by spatial density and area or region of space in the single structure, the database can be queried easily and quickly to return a subset of the data at a selected location and at a selected resolution. The data that is subsequently displayed to the user is then actual point data, from the subset, and not a geometric representation as in many existing systems. Subsequent queries can be run on this subset displayed to the user. Each query can use data in memory where available and go to the database only where necessary, in order to very quickly satisfy requests and allow the use of actual point data.

The data subset can be described geometrically, in space proportional to the size of the constraints rather than the size of the set being partitioned. Such an approach still can support real-time queries and visualization of the partitioned point set, making operations on previously intractable clouds not only possible, but very quick. Furthermore, several different partitions can be simultaneously defined on the same set, greatly reducing the need to duplicate sample data where multiple users wish to use the same data for different purposes.

The data structure for these systems can be built "out of core," with the data being processed at least partially, if not completely, while resident on a secondary storage device, such as a hard disk. The ability to utilize a secondary storage device can remove any computer memory-based limitations on the size of the data being processed. Also, the data structure can be built to a certain spatial density. This option can be used during the construction process to thin the data. By thinning the data to a specified density, the storage requirements can be reduced while a spatially uniform representation is maintained at a known level of accuracy. A data compression method can be applied, whereby each sample is stored as a fixed point element relative to an organizational cell. The level of accuracy can be specified by the user, for example, allowing both high and user-adjustable compression ratios to be obtained with relative ease.

Once stored, the data can be loaded and/or viewed in real time by supporting limits on the density of the data selected. An optimized presentation can be limited to a total number of loaded and displayed points from a given perspective. This is done in one embodiment by selecting blocks that are the most appropriate to view from that particular perspective, then coloring those blocks based on the desired subsets.

Geometric queries can also be run against the data, including points that exist within a specified geometric locus (e.g., the contents of a box, or within an inch of a given plane, or the set of points intersected by a given ray). There can be specified bounds on the total number of points to be accessed, as well as limits on the spatial density of those points. Supporting these bounds and limits efficiently therefore requires the loading of a limited, relevant portion of the data. Partitions of the set of points (referred to herein as subsets) can be specified with a scalable geometric representation (e.g., the locus of points bounded by a set of planes), rather than an explicit enumeration of the points that belong within such a locus. The subsets can be specified as efficient enumerations addressable by block, such that an explicit enumeration still can be provided if a geometric locus is insufficient. This can be done in a manner that can still efficiently support block-by-block visualization. The subsets can be combined with basic set operations (e.g., union, intersection, and negation) with the ability to dynamically simplify those subsets to a more efficient mathematical form. A subset also can be progressively specified by specifying successive geometric constraints from different viewpoints, without storing intermediate representations to the database. These successive constraints can be specified before storing the final optimized representation to the database.

In previous systems, a fence would be used to isolate a portion of a point cloud or data set and operate on only that portion. This approach becomes awkward as the points pass 40 million or more. Rather than compute the points to isolate, systems in accordance with embodiments of the present invention can use lazy evaluations, where a fence is used to load points and subsequent computations are only executed for those points that are visible on the screen (2-3 million) that are in that part of the fence. This lazy approach leaves the computation until it is needed, thereby saving time and processing effort by not operating on points that will subsequently be excluded. Previous systems had to touch each point to determine whether that point was to be isolated. Using lazy evaluation, only the parameters by which the cut is made are stored, instead of actually making the cut, allowing the cut to take only a matter of seconds regardless of the size of the data set. When the data is subsequently loaded, which can be on the order of 3-4 million points instead of 40 million, it is only necessary to determine how the partitions work on the loaded points, instead of the whole set.

Points in a block that belong to a particular subset can be identified on-the-fly, without accessing other blocks, such that subsets can be displayed during visualization without incurring extra database loading overhead. Further advantage can be obtained by using geometric queries to register the data, in order to provide an evenly distributed, reduced sampling of the point sets to be registered. After registration, a construction process can form a unified representation of the registered data sets. Annotations can be added to the unified representation to allow the system to identify the data source for each point.

A shared cache of blocks can be used that allows all queries and visualization processes to share a common memory space. This shared cache can reduce or eliminate the need to have the same block data presented more than once in computer memory space to satisfy queries and visualization requests that overlap in space or point density requirements. A shared loading mechanism can batch requests for blocks from multiple disparate queries or visualization processes, so that bandwidth from the database to memory is maximized for the purposes of simultaneous access by different queries and visualization processes.

Embodiments including those described above can utilize any appropriate type of data, as well as any of a number of methods of data acquisition. Embodiments discussed herein will be described with respect to specific applications for simplicity, which should not be viewed as a limitation on the present invention. Particularly, the embodiments will be discussed with respect to methods of data acquisition that, over some period of time, produce geometric point data annotated with other pieces of information, such as LIDAR, photogrammetry, tomography, touch pendant 3D digitizers, manual sampling methods, or combined methods that use more than one of these approaches to acquire sample data.

Exemplary Data Structure

Figure 2A:
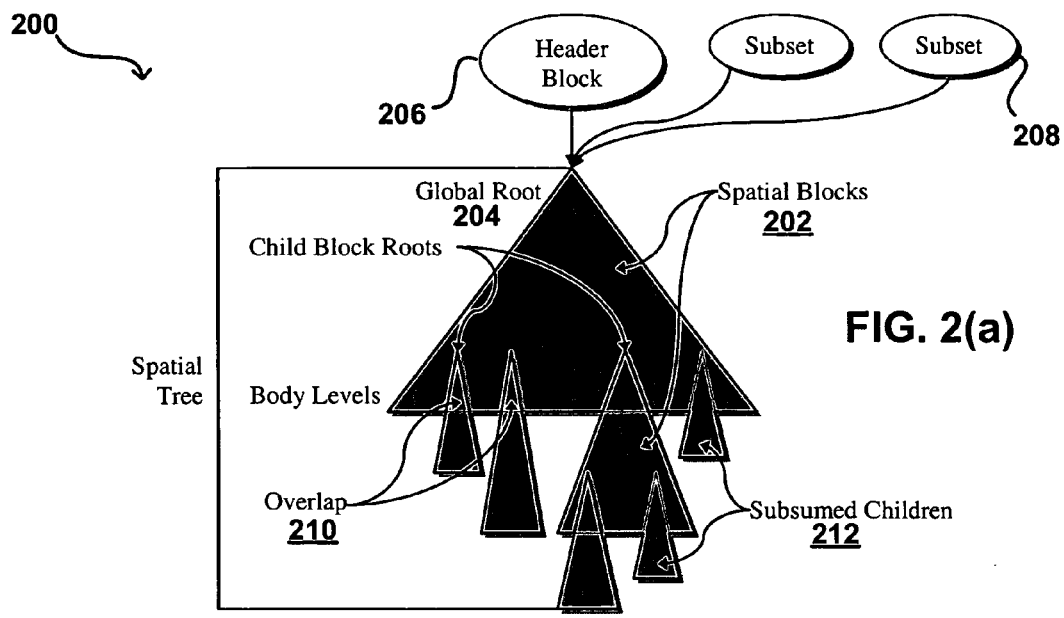
FIG. 2 is a diagram showing (a) the relationship of spatial blocks to point clouds and (b) a basic point set tree structure, organized in blocks, in accordance with one embodiment of the present invention.
Figure 2B:
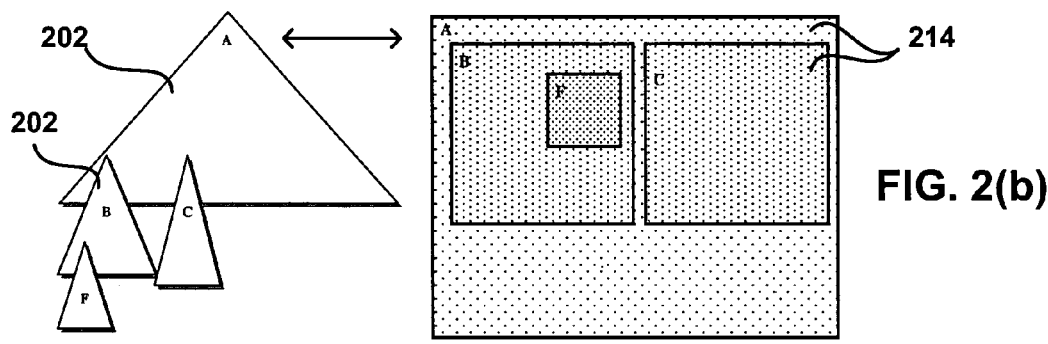
Figure 2C:
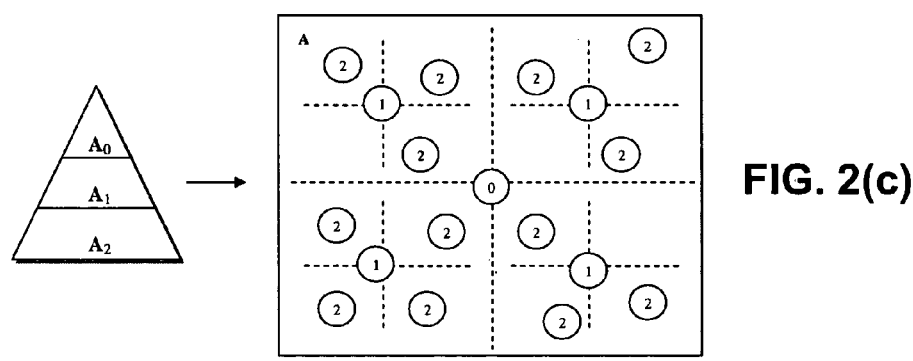

A data structure 200 that can be used in accordance with one embodiment of the present invention is shown in FIGS. 2(a)-2(c). As seen in FIG. 2(a), this data structure 200 is in the form of a basic point set spatial tree, formed from a series of spatial blocks 202 at a number of body levels. The tree grows from a global root block 204, as well as a plurality of header blocks 206 containing transformation information. The tree also grows from one or more data subsets 208 specifying partitions of the data set. Each block in the point set tree structure can contain several contiguous levels of the overall spatial tree. Some points can be shared in the overlap region 210 between each child block and the corresponding parent block. Subtrees below the bottom of the body of the block that are below a certain size 212 can be children that are subsumed into the parent block at construction time as described elsewhere herein.

FIG. 2(b) shows the relationship of these spatial blocks 202 to point clouds of an object or area from which the data is captured. Parent blocks, such as block A, represent larger areas of space, which can have a smaller spatial density of points. Child blocks, such as blocks B and C, represent sub-regions of their parent, here block A, with each child block having points represented at higher densities. Block F is a child of block B, and can be seen to have a higher density of points. There can be multiple levels within each block, with each level covering the same spatial area. The higher levels within the block can cover the same area more sparsely than the lower levels.

For example, as shown in FIG. 2(c) there are three levels in block A. Each subsequent level has a density of four to one relative to the previous level in 2D space, or eight to one in 3D space. The top level $A_0$ contains one point (shown as point 0 in point cloud A) and represents the entire area of block A. The second level $A_1$ contains four points (shown as 1 in point cloud A), each point representing an area one fourth of the total area, a density of two to one. The third level contains thirteen points in this example, since the actual scan data is not evenly spaced and not every portion of a level will have a representative point. Each of these 13 points then represents an area that is one-sixteenth of the total area. Three-sixteenths of the level will not be represented by a point, which correspond to gaps in the source data or other blocks in a block structure.

The spatial blocks represent a partitioning of the 3D point data into layers that can be indexed spatially by both location and density. Each layer within a spatial block can represent a cross section of the data at a given density, and can cross boundaries between spatial blocks when the levels beneath the root spatial block are considered. While a number of spatial organization principles can be used, it can be preferred in at least one embodiment to use an octree structure due to the evenness of the partitioning across each layer. An octree data structure, as known in the art, is a tree used to index in three dimensions, where each node has between zero and eight children (for an octree representation a block with eight children will on average have 3.5 children with points in them, in one example). It should be understood, however that aspects of the present invention can be used with any appropriate hierarchical spatial structure, such as may include KD-trees, B-trees, or fixed spatial grids as known in the art.

Figure 3:
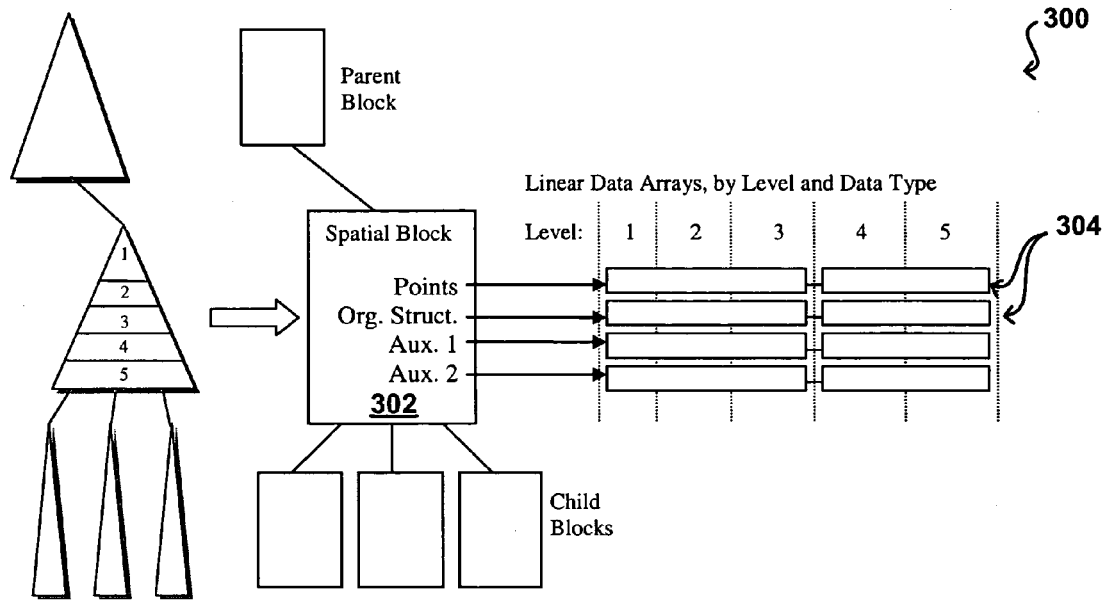
FIG. 3 is a diagram showing the structure and storage of a spatial block in accordance with one embodiment of the present invention.

In an exemplary structure and storage approach 300 for a spatial block 302, as shown in FIG. 3, each spatial block can contain a set of data arrays 304, including an array to store the sample data, a corresponding array to store the organization structure per sample, and arrays for storing auxiliary data fields for each point. As shown in the Figure, each point can be represented by a "vertical" slice 306 through the "horizontal" data arrays in the figures. Each horizontal data array stores one data type; the total set of data types includes structural data, and may include point data and zero or more auxiliary data types. The horizontal arrays are the same size in this example, and can be organized such that each layer within the tree forms a contiguous section of the array. The layers can be arranged top to bottom in order in the array. Relationships can be seen between spatial blocks 302 and the internal storage for those blocks in linear data arrays 302.

Data types also can be grouped together in the arrays. Each data type can have a set of linear arrays of equal size, which can be partitioned at level boundaries. When stored, the linear arrays representing each data type within a spatial block can be partitioned into segments. Each of these segments can contain the portion of the array that corresponds exactly to one or more contiguous layers of the spatial organization, such as is shown in FIG. 3. This approach can provide for more efficient loading of child spatial blocks, as in many cases only a subset of the layers within a spatial block need to be loaded to satisfy a data request. There also can be overlap between a spatial block and the corresponding parent, in that the samples corresponding to the top several layers of a spatial block can be replicated in any parent spatial block. In that case, the child spatial block can choose not to explicitly store those samples which form the overlap.

Within the organization structure array, there can be a variety of information available at each point. In one embodiment, this information includes the index of the parent sample within the spatial block, corresponding to the parent in the basic organizational structure (one level above the level of the sample). The information also includes the index of the first child sample within the spatial block, corresponding to the element of least index in the array (representing a sample one layer below the level of the sample that partitions the space represented by the sample). The information includes a field describing which subsection of the space of the parent sample is represented by this particular sample. In an octree embodiment, for example, this can be a 3-bit field storing which octant of its parent the sample represents. The information in this embodiment also includes a flag field indicating whether this sample represents the last sub-sample of this particular parent in the array. Another flag field indicates whether there are subfields of this field within other spatial blocks, as well as a flag to indicate whether there is another spatial block "rooted" at the location of this sample. These flag fields can increase the efficiency of queries on the structure. In the case where the child of the sample is in another spatial block, the child field can refer to the index of the child in that other spatial block. It should be understood that not all these fields are required in all embodiments, and that additional fields can be used to further enhance the various processes.

Figure 4:
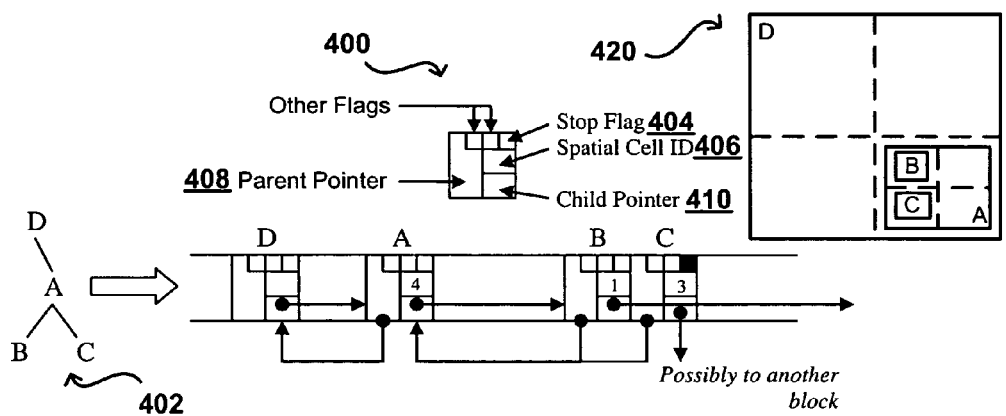
FIG. 4 is a diagram showing the internal structure of cells of an organization structure array for a point in accordance with one embodiment of the present invention.

For example, FIG. 4 shows an exemplary internal structure 400 for cells of the organization structure array for a given point. The relationships 402 of four nodes are shown, as well as how these relationships map into the organizational structure 400. Block D has A as a child, which in turn has B and C as children, as designated by the appropriate parent pointer 408 and/or child pointer 410. Block B occurs before C in the array, so block C can include the stop bit 404 set, since C is the last child of block A. In this diagram, A is in the fourth cell of D, B is in the first cell of A, and C is in the third cell of A, as identified by the corresponding Spatial Cell ID 406. This can correspond to the spatial block arrangement 420 shown in the Figure.

Each spatial block also can store general pieces of information about the spatial block, such as a set of references to any child spatial blocks, indexed by the path from the root sample for the parent spatial block, through the block, down to the location of the root sample of the child block. A path can consist of an array of organizational subspace specifiers, such as the octant of the child for octrees, for each step down the tree from the parent root to the child root, which can uniquely specify such a path. The information also can include the sizes of each layer of the spatial organization structure from the root of the spatial block down to the end of the spatial block, as well as from the root of the spatial block down to the bottom of the entire structure. The bounding region of the root sample of the spatial block within the greater organizational structure also can be included, as well as the bounding region specifying the bound of the entire subtree of samples rooted at the root of this block. Each block can store the spatial resolution of each layer of the spatial tree, from the root of the spatial block to the end of the spatial block, as well as the resolutions of each layer from the root of the spatial block to the bottom of the spatial tree. The path from the root of the parent spatial block down to the root of this spatial block also can be stored, as well as the path from the root of the spatial tree down to the root of this spatial block. The block also can contain a reference to the parent spatial block of this spatial block, the number of levels of the spatial block that are contained in the parent spatial block (e.g., that overlap with the parent spatial block), and bounds on the ranges of the auxiliary information per sample, for one or more of the types of auxiliary information, within this spatial block as well as within the subtree of samples within the spatial tree rooted at this spatial block.

The basic structure also can contain one or more header blocks that refer to the root spatial block of the spatial tree. These header blocks can allow the system to specify a rigid body transformation of the tree as a whole, allowing the point set to be "moved" without affecting any of the data within.

Subset Structure

Figure 5:
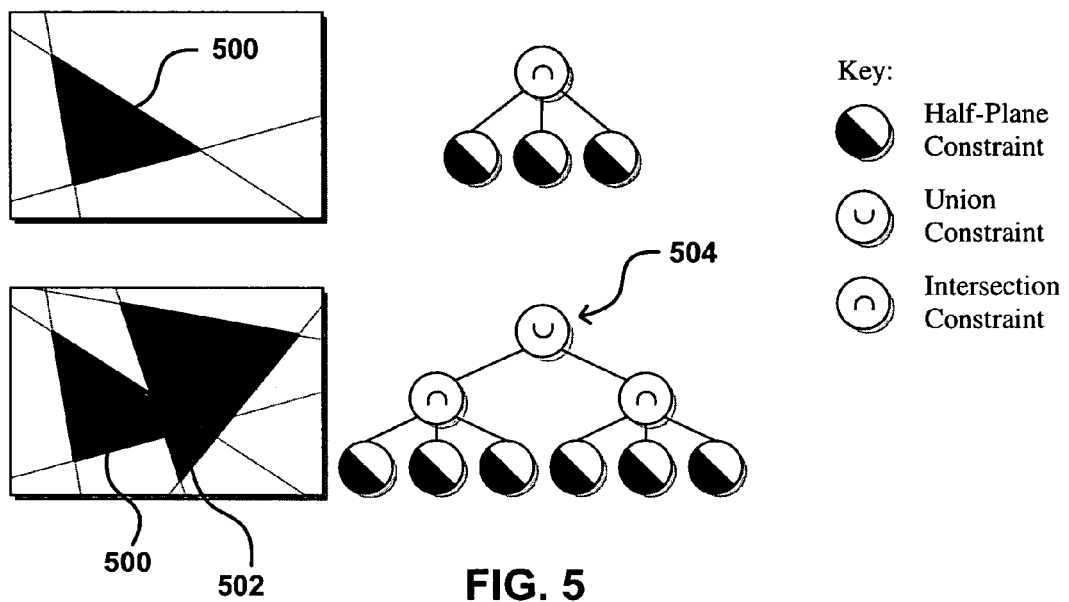
FIG. 5 is a diagram showing the construction of a set expression representing the union of two fences in accordance with one embodiment of the present invention.

In addition to the basic structure described above, one or more subsets of the point set can be stored, as embodied by the spatial tree. In order to describe a subset of points within a point set, a number of mechanisms can be used that can include a filtered subset, an enumerated subset, and/or a composite subset. A filtered subset can be used where the set can be partitioned by a filter that describes the points in the subset. For instance, FIG. 5 shows the construction of a set expression representing the union of two fences 500, 502. This can include a locus, or can be based on other logical filters on auxiliary data fields. In an enumerated subset, the points in the subset can be specified as a mask or enumeration of points in the original set. A composite subset, on the other hand, can be composed of a logical combination of filtered and enumerated subsets, which can use fundamental set operators such as union, intersection, and inverse. A filtered subset can be a more compact representation than an enumerated subset and can be quicker to generate, as the complete membership of the subset need not be determined at the time of creation.

Any subset can be treated as a standard viewable geometric object, having a bounding box and a renderable representation. The subset object can be stored in the global spatial organization structure for quick localized access. Subsets can be manipulated independent of the spatial tree and spatial block organization. Spatial blocks can be loaded for rendering independently, and point subset specific coloring and rendering can be applied to any blocks as the blocks are loaded.

In one embodiment, a point subset is represented by an expression tree. The internal nodes of the tree include the expressions union, intersection, and inverse, as discussed above, which can provide a logical way to combine subsets. The "leaves" in the tree can be the constraint primitives, which can include geometric locus primitives such as half-spaces, projected polygonal fences, spheres, cylinders, and cones. Other geometric and logical primitives can be encoded and applied as needed by the particular application. Common combinations, such as parallel planes or caps on cylinders and cones, can be included in the primitives for faster computation. Special expression tokens can represent full or empty subsets. Expression nodes also can be defined to partition the points by properties such as color or normal vector direction.

Set expressions can be built up through user operations, such as by selecting a fenced region in the display. Set expressions also can be built up programmatically by processes that automatically generate subsets of various kinds. For example, a user can start with a full subset and draw a polygonal fence 500 on the screen, such as shown in FIG. 5, and can select the points inside the fence. If the fence is convex, the description of the result is an intersection of half-spaces. If the user further restricts the set by adding the contents of another bound 502, the result is the union between the original fence expression and the new fence expression. This union can be represented by creating a union node 504 and adding the two fence expressions as children.

Such subset representation allows quick identification of spatial blocks and points, from the point set, that are members of a subset. Each element of a subset representation can support a quick intersection test with a volume of the spatial subdivision used by the point sets, enabling a quick tree-ordered traversal to collect the points in the subset with a minimum of computation. Each expression node can maintain a bounding box of the corresponding result, useful for quicker trivial rejection in unions and intersections. New geometric constraint primitives can be added to the expression system quite easily. In order to add these new primitives, a function can be defined to determine whether a single point is inside or outside, and a quick test to determine whether a volume of the spatial subdivision structure is contained by, or intersects, the constrained set.

Subset expressions can be used to represent user selections and modeling cuts in the point set, such as using a half-space to separate the points belonging to a flower from those belonging to the ground. However, these expressions also can be used to identify the results of computations, as well as for point picking. When a user attempts to pick a point in the display, a volume in space can be described that contains any valid pick results. In a perspective projection this volume can be a cone, while in an orthographic projection this volume can be a cylinder. Quick subset membership calculations can be used to identify valid pick points within this volume. The current best pick, or the front pick in drill-picking, can contribute a half-space constraint to the pick volume.

Since a single set of geometric primitives cannot represent all possible subsets, it can be desirable to provide a general subset representation. A special expression node representing an enumeration can be included in the expression grammar to represent subsets that are not naturally described by the simple geometric constraints. Basic mechanisms that can be used to describe an enumeration include a list of the points included in the set, as well as a binary mask over all the elements. In one embodiment, a mask is used over the linear arrays of points in the spatial blocks. Since the points are arranged in a spatial tree structure, performance of the enumerated sets can be enhanced by including subtree containment information. Bits can be added to each mask element to describe whether the subtree, rooted at that element, is fully contained in, or fully disjoint from, the set. This information allows the enumerated sets to utilize the same optimized traversal functions as the geometric filters. The block structure of the point set can be used to simplify the mask representation. Any block that is fully contained in, or completely disjoint from, the subset can be represented by a single value, rather than by a mask at each point. An enumeration is an ordinary node in the expression grammar, which can be included in intersections and unions with geometric expressions.

The enumeration representation also can be used as a cache of the subset computation. Expressions can be expensive to compute as the expressions become more complex. While a full mask of the subset might be quite large, a partial mask covering the upper levels of the point set tree can be relatively compact, allowing for quicker traversal of those portions of the tree. The root block of the tree can be traversed by every operation, so improving the performance of subsets in this block can yield noticeable improvements in speed for all operations. Such a hybrid representation can be more scalable than a simple mask representation, as the detail levels of the point set tree do not need to be enumerated. The performance should not degrade as the underlying point set becomes very large.

An abbreviated mask can be used when computing an enumeration representation, as the result of an operation with an error tolerance. Each level of the spatial subdivision structure can have an error that varies monotonically with the size of the subdivision cells. In an octree, this error is halved at each level, such that a global depth across the whole tree has the same error. When the depth corresponding to the error tolerance is reached, no further computation is necessary. The subtrees below that level can be considered fully in, or fully out of, the subset, since the largest possible variance within that subtree is smaller than the error tolerance.

Composite Subset Expression Simplification

In order to manage composite subsets, which can become quite large through sequences of unions, intersections, and inverses of constraints and expressions, it can be desirable to simplify the way in which those composite subsets are expressed. Expression simplification can be achieved most easily by identifying and removing redundant constraints. In the case of an intersection of half spaces, for example, useless half spaces can be identified through linear programming or other analytical techniques. While analytical techniques can be used wherever possible, these techniques may need to be enhanced by enumerative techniques to provide additional simplification for point samples. For example, the meaning of a subset expression can be defined by the partitioning of a point set into "inside" and "outside." The subset is operating over the discrete domain of a point set, rather than the continuous domain of three-dimensional space. Constraints then can be removed that could not otherwise be removed analytically, since the constraints are useless in the context of that point set.

Figure 6:
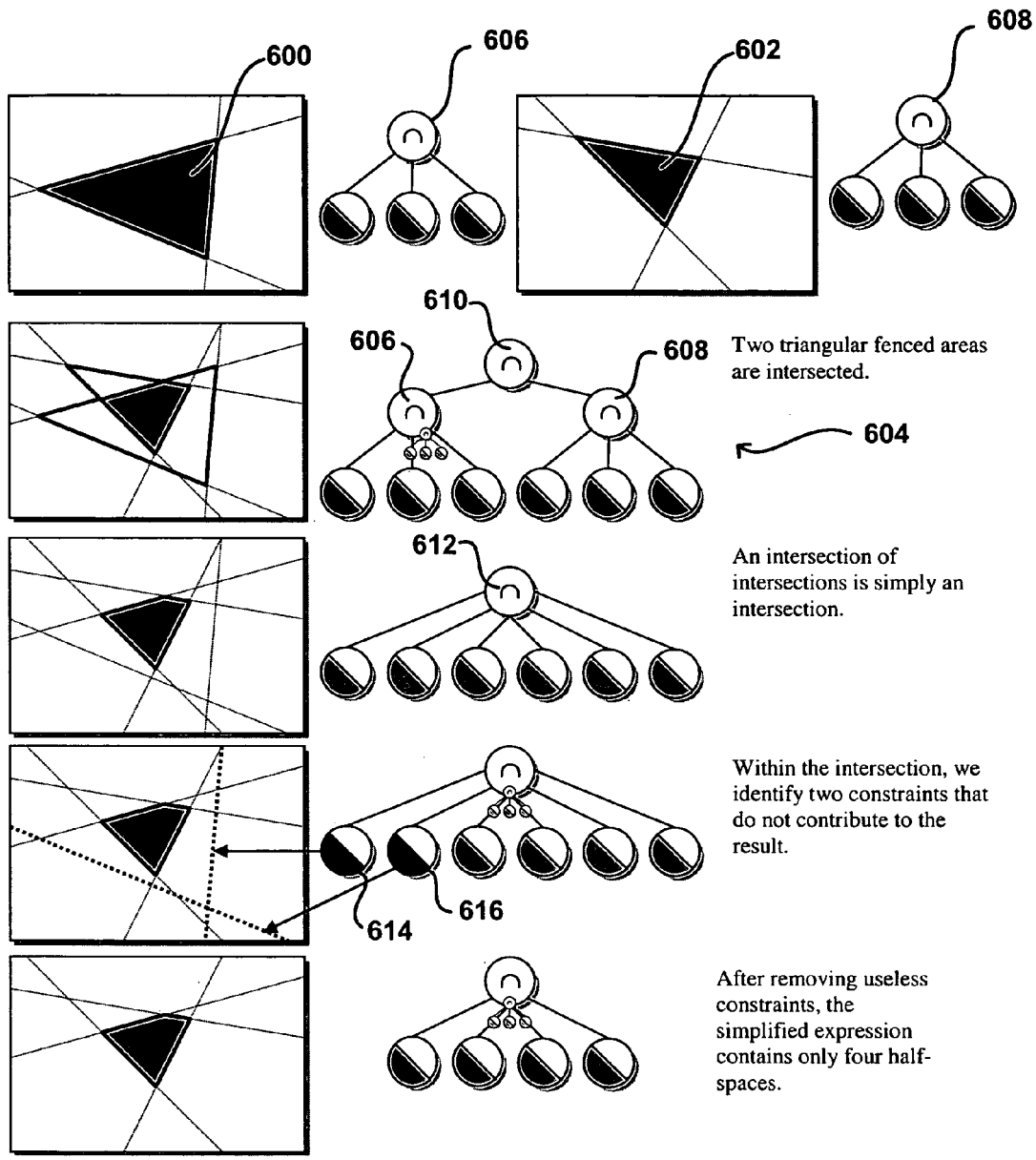
FIG. 6 is a diagram showing the simplification of a set expression in accordance with one embodiment of the present invention.

An example of the simplification of an expression will be described with respect to FIG. 6. In the figure, two triangular fences 600, 602 are intersected. For each triangular fence, the relevant expression has an intersection node 606, 608. When the fences are combined, the expression contains an intersection node 610 showing the intersection of intersection nodes 606 and 608. Since intersection node 610 is really the intersection of the two fence expressions, or the intersection of the constraints of each fence section, a new intersection node 612 can be created that is simply represents the intersection of the constraints for both fences. Once the two fence expressions are added together under the new intersection node, the expression can be simplified by identifying and removing two constraints 614, 616 that do not contribute to the result. After simplification, the expression contains only four half-space constraints instead of six.

Expressions also can be structured internally to provide faster computation. In the case of a union of many small pieces, for example, any excluded point can be identified only by being tested against every member of the union. A more efficient organization of the expression can be obtained by grouping the members of the union hierarchically into smaller unions. When testing a point against the expression, the point then can be rejected by the bounding boxes of some of the sub-unions, rather than requiring a separate test against every member of the original union.

Spatial Block Construction Process

Figure 7:
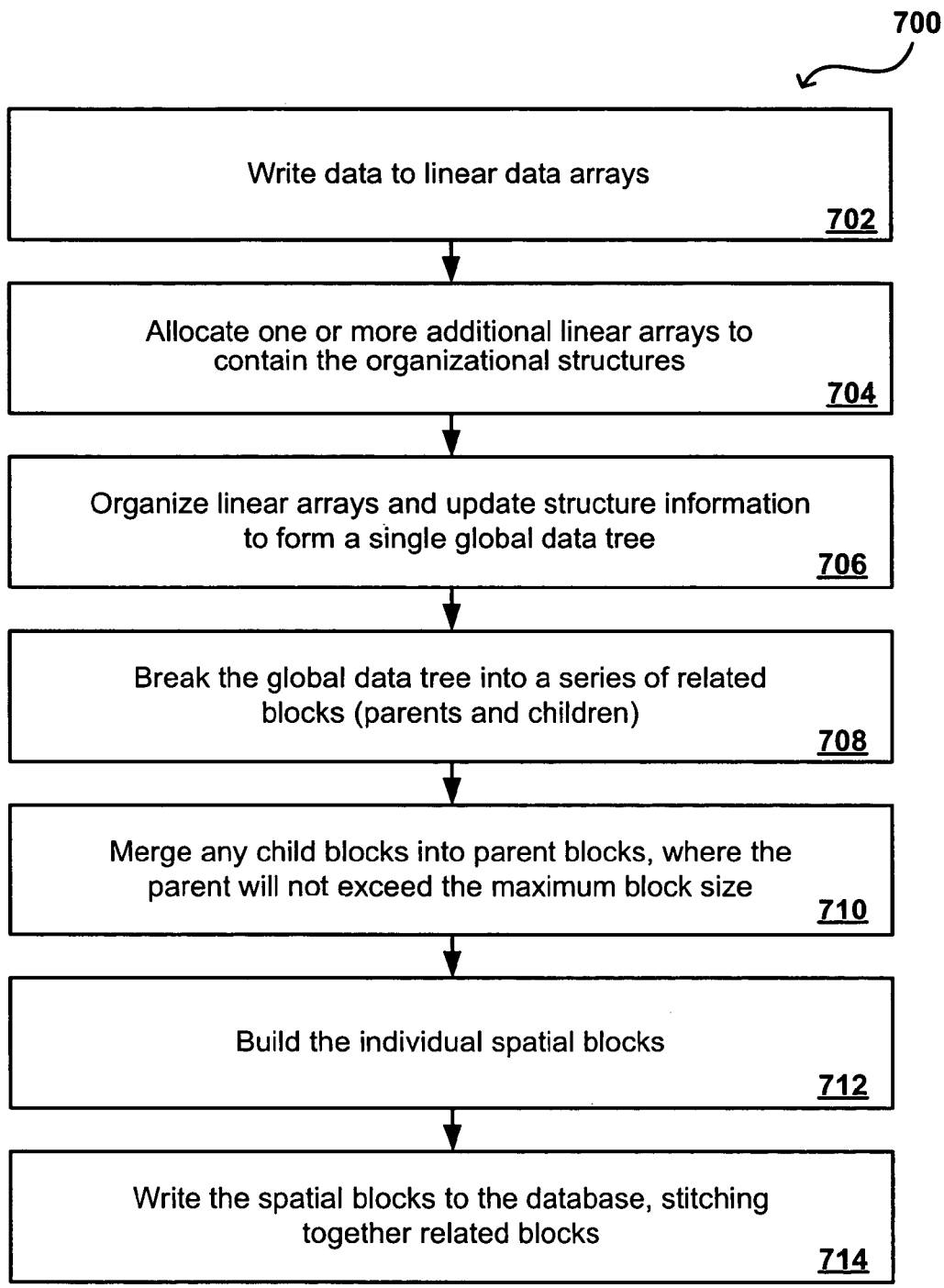
FIG. 7 is a flowchart showing steps of a spatial block construction process in accordance with one embodiment of the present invention.

An exemplary construction process 700 to build a basic structure from a set of point samples in accordance with one embodiment of the present invention is shown in FIG. 7. In this process, the scan data is written to a set of linear data arrays 702. These arrays can be formed after each scan, for example, and may contain point data and zero or more types of auxiliary data per point, such as but not limited to intensity data, color data, normal data, or scan pattern data. At least one additional linear array can be allocated to contain the organizational structures 704. The linear arrays can be organized, such as by level and data type, and the structure information can be updated, in order to form a single global data tree 706. The global data tree can be broken into a series of related blocks, such as a series of parents and children 708. Any child blocks can be merged into corresponding parent blocks, where the merged parent will not exceed the maximum block size 710. Once any possible merging is complete, the individual spatial blocks can be built 712. These spatial blocks then can be written to the database, stitching together related blocks 714.

Details of how to accomplish these steps in accordance with one embodiment are now described for an exemplary data set. In this process the data can be written into a series of linear arrays and organized in place. Each array can be in any appropriate location, such as in resident memory or on a secondary storage device. The size of the input data can determine whether the data set being processed will fit in memory. Once the data, including the sample data and auxiliary information per sample, is written to the arrays, at least one additional empty array can be allocated, with each additional empty array being are equal in size to the number of sample points to contain the organizational structures.

A number of approaches can be used during the organization process. An exemplary algorithm will be described with respect to FIG. 8, which shows one way to obtain spatial tree organization on the data. This algorithm consists of a recursive process which starts with the data set as a whole, and a bounding box of the whole set. The figure shows one intermediate recursive step in the partitioning phase of the example construction algorithm using a variation on a quicksort process as known in the art. Other processes can be used to sort the data, such as a merge sort process that will be described later herein. A recursive approach can be efficient for in-memory operations, while other sort approaches can be more efficient when the data is stored to a device such as a hard drive.

Starting with a segment of the input array 800 in the exemplary sorting example, eight contiguous partitions 804 are made. The "best fit" element 802 then is moved to the head of the segment. Eight recursive calls then can be made, forming the subtrees and placing the best fit element 806 of each sub-segment 804 at the beginning of that sub-segment. Finally the sub-segment head elements 806 can be stitched together with the segment head element 802 to form the full subtree for the segment.

In this particular recursive example, there is a range of data in a linear array 800 from index b to index e, with a bounding box B at spatial layer 1. From the bounding box B, it can be determined which n geometric sub-bounds with bounding boxes $B_1 \ldots B_n$ form the child regions of the given sample region. For an octree implementation, this can consist of eight sub-bounds which form the eight octants of B. The data elements in the array range b . . . e can be swapped such that each sub-bound forms a contiguous sub-range $b_j \ldots e_j$ in the range b . . . e, for j from 1 to n. For an octree implementation, this can consist of seven partition operations: one along the x-axis partitioning the set into two sections, two along the y-axis partitioning those sections each into two sections, and four along the z-axis partitioning those four sections into eight sections. Some of the sub-ranges may be empty.

Simultaneously, it can be determined which element s best represents the sample for bounding box B at level 1. Element s then can be switched to location b, adjusting any sub-range as necessary. On the first partition operation the point samples can be evaluated with any appropriate function to determine the best point to represent that subrange. For example, one function might be to compare to the centroid of the bounding box, with the closest point to the centroid being considered the best point s. An alternative example would be to randomly select a point s from the range, which can be a better choice in some circumstances. There may be other functions that yield the best point for various applications; this approach can subsume those other functions. This function then can be called recursively on each non-empty sub-range, with the appropriate sub-region bounding box $B_j$. Each recursive call can result in a subtree in the organization structure array rooted at $b_j$, for each j. For an octree implementation this can result in up to eight sub-calls, depending upon which sub-ranges are empty, if any, and can result in up to eight sub-roots.

Each sub-root, $b_1$ through $b_n$, then can be linked to the main root at b, the element that was formerly at s. For each sub-root, the appropriate field can be set to indicate the appropriate subspace of the parent. In an octree implementation, the octant field for each sub-root can be set to the octant that sub-root represents in the main bounding box B. The root for the main tree now resides at index b. Upon completion of this operation, the organization structure is complete for the entire sample set, rooted at the first element of the tree.

In an alternative embodiment, a merge sort-based approach can be used to perform the spatial organization. While the end result can be the same as for the quicksort-based approach described above, a merge sort can be more efficient when the data is stored on a device with extremely slow access times, such as a hard disk. In this case, the recursive algorithm described above can be inefficient because the access patterns to the data are scattered throughout the array. Instead, the merge sort-based process can be used that includes two steps to obtain the same set of arrays, such as a point array and a corresponding organizational array.

In this approach, the point data can be encoded as a path in the global octree whose root consists of the bounding box of the point data. This can involve a conversion from an (x,y,z) triple (for three-dimensional point information) to a single integer code consisting of a concatenated series of octant codes, each of which is three bits including an x-bit, a y-bit, and a z-bit. Each code can consist of a single level of the global tree. The concatenation of the codes for all levels of the path down the tree for the given point can be considered as a single large integer. A first step of this sub-algorithm is to sort the coded points, such as by using a simple sort on the integer code. An efficient way to sort these codes on a disk is to use a merge sort algorithm. As codes are generated, they can be stored in a RAM buffer or other appropriate memory storage. This buffer can be any size that fits in system RAM, but for maximum efficiency can be as large as possible. When enough points have been generated to fill the buffer, the buffer can be quicksorted and written to a disk file (henceforth called a level 0 file). The buffer then can be cleared and the process started afresh.

The buffer also can be quicksorted and written to disk when the next buffer is full, creating another level 0 file. There then could be two level 0 files, which can be mergesorted into a single level 1 file, whereby the level 0 files are deleted. Subsequent buffers can continue to generate new level 0 files, which can be merged recursively with existing files of various levels using an algorithm such as the following:

Insert file of level X:
1. If there is no current file of level X, this file becomes the current file of level X and the merge is complete.
2. If there is an existing current file of level X, the files are mergesorted to create a file of level X+1. Insert the file of level X+1 recursively with this algorithm.

When no more points are to be inserted, there can be a number of current files of various levels. These files can be merged with each other until only one file remains.

A second step in this process generates the organizational structure from the sorted points. This process can involve a linear pass through the sorted point array using an algorithm such as the following:

Start with active level AL=0.
Maintain an array of elements, LastSeen(element).
For each element in the sorted array:
1. Determine the level L of the first code from the root that differs from the corresponding level code of the last point seen.
2. If L>AL,
  a. Stitch the current element as a child of the LastSeen (AL),
  b. Set AL=AL+1,
  c. LastSeen(AL)=current element.
3. If L<=AL,
  a. Stitch the current element as a sibling of LastSeen(L)
  b. Set AL=L.

When complete, the organizational structure can be valid and equivalent in nature to the organizational structure obtained with the recursive algorithm. Because this algorithm involves linear "sweeps" through the data, the throughput of the algorithm on hard disks can be vastly superior to the throughput of the recursive algorithm described previously. However, the recursive algorithm still can be useful, such as where the data set is small enough to fit in system RAM all at once.

In the second phase of the overall construction process, a determination can be made as to how to cut this single, large structure into multiple related blocks, where as many blocks as possible are within a given size range. Although there are a number of approaches that can be used, one exemplary approach uses two sub-phases: a blocking sub-phase and the merging sub-phase. For the blocking sub-phase, an algorithm can be used to estimate the expected size of two full levels of blocks in the final tree, given a root sample r, a desired block size h, and a desired child branching factor k. On average, there can be k·h/c points in two levels of the tree, where c is a constant that has been observed to lie in the range of 4-6. Because it can be more important to have blocks of approximately constant size than to have an approximately constant branching factor, the child branching factor can be adjusted to achieve constant size blocks. The global tree can be broken into blocks by applying a series of steps recursively. In these steps, the size of the subtree rooted at r can be enumerated, and the sizes of each layer of the structure stored, until at least k·h/c samples have been enumerated. If this subtree is wholly contained within the parent block, no new block is needed and the next recursion can begin. If the number of enumerated samples n is less than h, the subtree rooted at r can be marked as a block. If the number of enumerated samples n is less than k·h/c, a new child branch factor k'=n·c/h can be computed. The last level of the subtree rooted at r that has fewer than k elements can be found. The elements in this level can be the roots for the next level of subtrees. The result of this process is a set of records describing spatial blocks to be created, where each spatial block is rooted at some location in the tree, has a known depth in number of layers, and can have a plurality of sub-blocks as children rooted somewhere in the body of the block.

After this process is complete and the full set of spatial block records has been created, some blocks may be very small, while the respective parents may be smaller than the maximum block size. In general, it can be desirable for blocks to be as close to maximum size as possible, reducing database loading overhead during visualization. Thus, a second sub-phase, namely a merging sub-phase, can look through the block list for any blocks without children that are small enough that they can be added to the parent block without causing the parent block to grow larger than h in size. These spatial blocks can be marked for inclusion in their parent spatial block.

Figure 9:
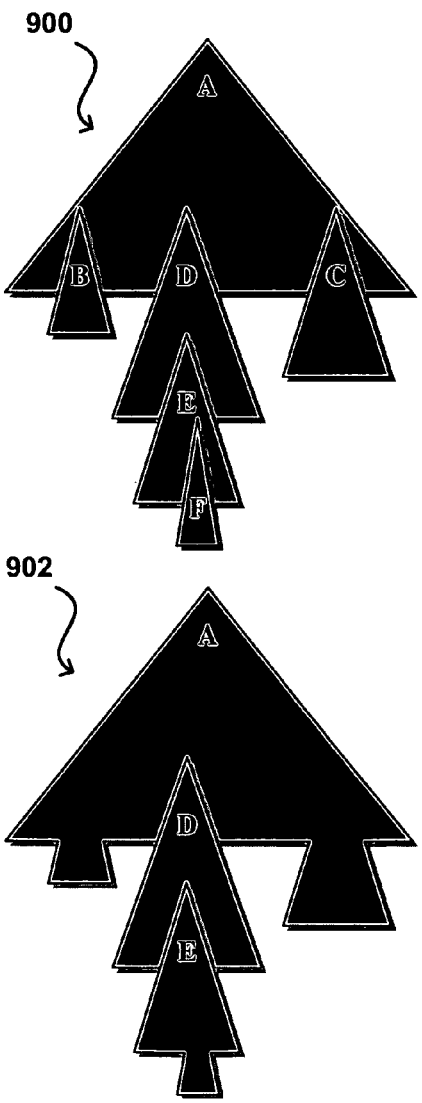
FIG. 9 is a diagram showing subsumed child blocks in a point set tree structure in accordance with one embodiment of the present invention.

An example of this approach is shown in FIG. 9. Each block in the point set tree structure 900 can attempt to subsume as many child blocks as possible, starting with the smallest child block. The final size of each block may be no larger than h, the maximum block size limit. In this example, child blocks B and C are subsumed into their parent, A, and child block F is subsumed into parent E, arriving at the new point set tree structure 902. Each block can have points that are new to that block, as well as some points that are shared with the parent in the overlap region. When considering whether to subsume a child into a parent, only the new point total need be considered, since the overlap points are already in the parent block. Otherwise, any criteria can be used to decide which children, if any, are subsumed into the parent block. The simple criteria discussed herein starts adding children to the parent, smallest first, until the limit size for the parent is reached.

The third step of this construction process builds the individual spatial blocks and writes these blocks to the database. When constructing a block, the subtree corresponding to the spatial block can be extracted from the overall spatial structure generated in the first phase of the construction process. The extraction can involve performing a breadth first traversal from the root of the spatial block through the layers underneath the root, writing the organizational nodes crossed as well as the samples themselves and auxiliary data corresponding to each sample. The traversal can stop when a depth is reached that is equal to the layer limit of the block, unless the node in question is part of a child block that was marked as merged into the parent block. In that case, the layer limit under that block can be reset to the layer limit of the child block that was merged. This self-contained structure then consists of the subtree that forms the union of the subtree rooted at the block root and covering the specified number of layers in the tree, as well as all of the merged child blocks trees and covering the specified number of layers in those trees.

Figure 10:
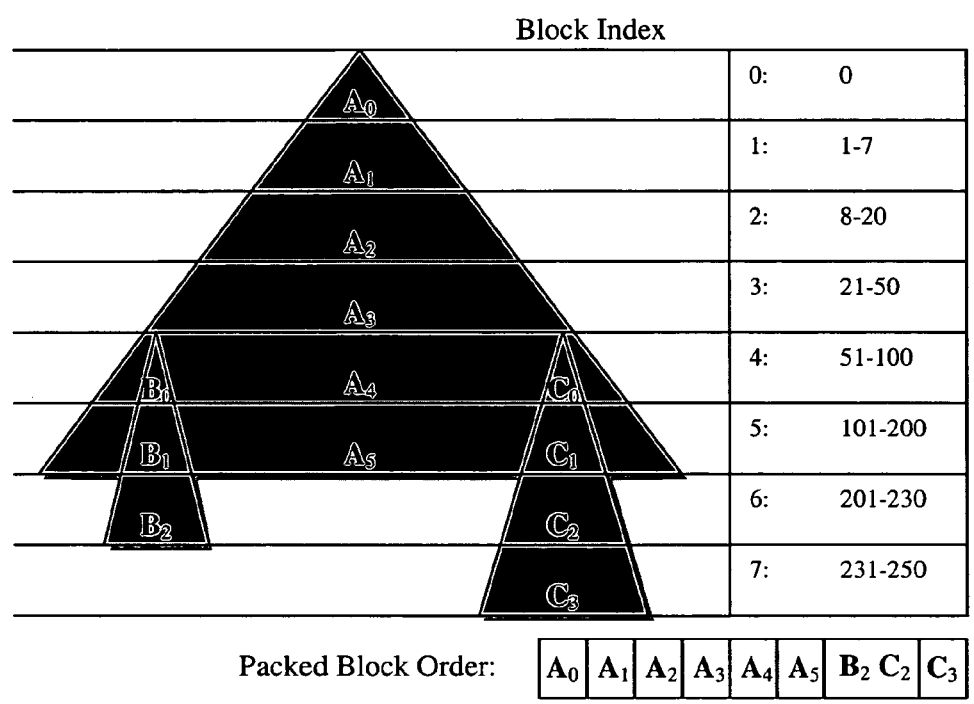
FIG. 10 is a diagram showing a layout of points in a single block of the tree structure in accordance with one embodiment of the present invention.

This can be explained with respect to FIG. 10, which shows an exemplary layout 1000 of points in a single block of the tree structure. This figure shows the root block from FIG. 7 in greater detail. Each level in this octree is packed sequentially, and the portions of the subsumed child blocks that overlap the parent need not be replicated in the packing. Block levels $B_0$, $B_1$, $C_0$, and $C_1$ need not be stored since the contents of those subsumed blocks are already represented as part of $A_4$ and $A_5$.

While the traversal is being performed, the number of samples at each layer of the reconstructed subtree also can be saved. The other flags can be set in the extracted subtree as appropriate, where the node had children in the overall tree that do not appear in the subtree, or where a node in the extracted subtree is a root of a child spatial block to be extracted separately. The extracted block in this process will have a total size less than the maximum block limit imposed in the second phase. If each block then is committed to a database as that block is built, the memory usage of this process is at most the size of one maximally populated block, which can generally easily fit in computer memory.

As points are extracted, an optional data compression scheme can be applied where the point samples are stored as fixed point offsets within the cells described by the spatial organization. Given that the user provides a maximum error tolerance for compressing the points, individual samples often can be localized within the spatial organization cells with only a small number of bits, compared to the standard full floating point representation, providing potential for extremely substantial compression ratios to the point where the combined data size for the spatial organization and the point data is much smaller than the original point data size alone.

As the blocks are extracted, the blocks must be related to each other in the database. As blocks are written to the database, the process can keep track of blocks that already have been stitched together. When a spatial block and the respective children have all been committed to the database, and the child blocks have all been stitched, the spatial block can become eligible for stitching. In the stitching operation, the statistics of the children regarding layer sizes and layer resolution can be merged with the statistics of the parent statistics to form aggregate statistics. These aggregate statistics can be stored in the parent, with the parent being linked to the children as indexed by the paths of the children in the parent, as stated in the basic description of the data structure. The parent then can be marked as stitched.

Eventually all spatial blocks can be extracted and stitched, at which point this particular construction process is complete. Any files written to a secondary storage device can be deleted, and the newly-created spatial tree can be assigned a first header block. At this point, the spatial tree is ready to be used in the database.

Visualization Process

In order to provide a visualization to a user when loading a model including a point set, the system can render the point set with colors appropriate to the subsets defined on the point set in that model. Visualizing large data sets can be problematic, however, as the number of points in the set can far exceed the number of available screen pixels. In order to allow for a display of the data set, a spatial sub-sampling of a number of points can be taken that is proportional to the screen resolution and size (typically a few million points/pixels). This sub-sampling can be used to generate an accurate view of the overall data set, using a fraction of the resources necessary to render the entire set. It therefore can be desirable to determine a process high-quality sub-sampling of the points of the data set, giving an accurate representation of the set using actual data points. This sample can be done without accessing more than a minimum number of points necessary to create this accurate view, or can use a number of points available for display, if appropriate.

Figure 11:
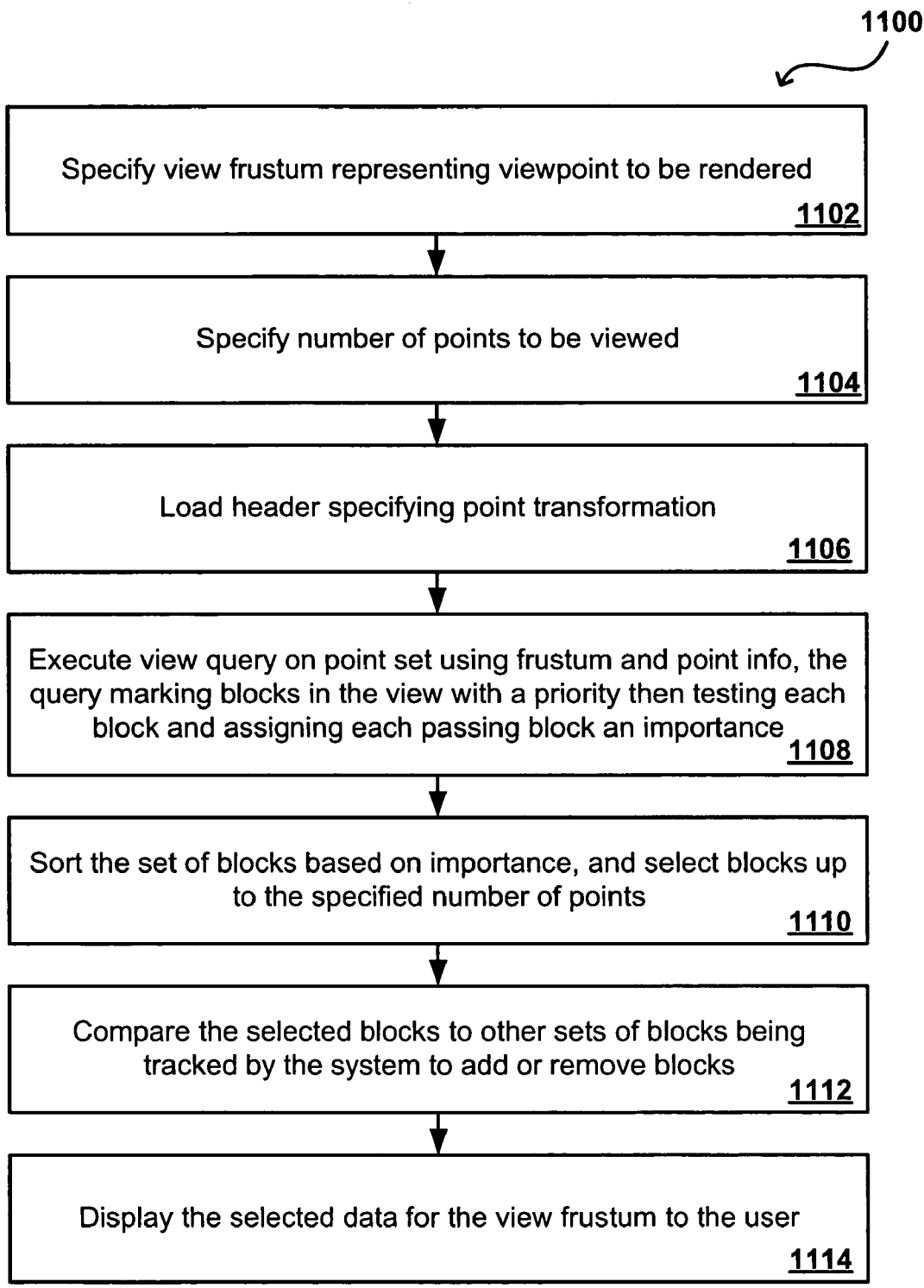
FIG. 11 is a flowchart showing steps of a visualization process in accordance with one embodiment of the present invention.

An exemplary process 1100 for displaying points for a selected view is shown in the flowchart of FIG. 11. In the process, a user can specify a view frustum representing a viewpoint to be rendered 1102. A maximum number of points, or a desired resolution, can be specified, either by the system or by the user 1004. A header can be loaded that specifies the point transformation to be used 1106. A view query then can be executed on the point set using the frustum and the point information, the query marking blocks in the view with a priority then testing each block and assigning each passing block an importance 1108. The set of blocks then can be sorted based on the assigned importance, and a number of blocks can be selected by importance up to the specified number of points 1110. The selected blocks can be compared to other sets of blocks being tracked by the system, and a determination can be made as to whether to add or remove blocks 1112. Once the blocks are finally selected, the selected data for the view frustum can be displayed to the user 1114.

In an example of such a query, a user or system process can specify a spatial area or region to be queried. The user or system also can specify a maximum number of points to be returned, such as can be based upon the display resolution or memory capacity. The user or system also can specify whether any auxiliary data is to be returned with the point data. The query then can be run against the database, and can return a subset of data points and any associated auxiliary data (if selected). This subset will have a maximum number of points equal to that specified, and will represent a spatial downsampling of the original point data set over the specified area.

For such a view rendering process, a viewer can load a header that specifies the transformation for the point set in the appropriate model. The viewer can specify a view frustum (see FIG. 10) that represents the particular viewpoint to be rendered. This viewpoint can be used to load subsets that are visible from that viewpoint, and can issue a view query to the visible point set that contains the specified frustum, as well as a total budget of the number of points the viewer wishes to show for that point set. The total number of points can be specified directly by the user as a preference related to the screen resolution in the case of a static scene. Alternatively, such as in the case of a dynamic scene, the number of points can be specified by a feedback loop that increases or decreases the budget depending on whether the desired rendering performance of the user is being realized.

A view query can begin at the root spatial block of a spatial tree. The view query can mark blocks that might be included in the view, marking those blocks with a priority related to how important those blocks are to the view. Each marked block can be required to pass several tests in order to be included in the view. If a block is not included in the view, then any children of that block are not considered for inclusion in the view. In one embodiment, each block to be considered in the view must have a bounding box that intersects the specified view frustum. The desired level of spatial organization to be displayed can be computed by projecting the error of each spatial organization level contained in the spatial block back to the screen coordinates. A determination then can be made as to whether that error level would project to less than the number of pixels that correspond to the drawing radius of a point. The level of organization for which this is true can be the smallest level of organization that can be drawn. If that level is smaller than the level marked as being contained in the parent spatial block, the current block can be rejected as the parent block already will draw the necessary samples. Each block then can be compared to active subsets, with each block being rejected if no active subset claims that the spatial block contains points that are considered to be active in that active subset.

Figure 12:
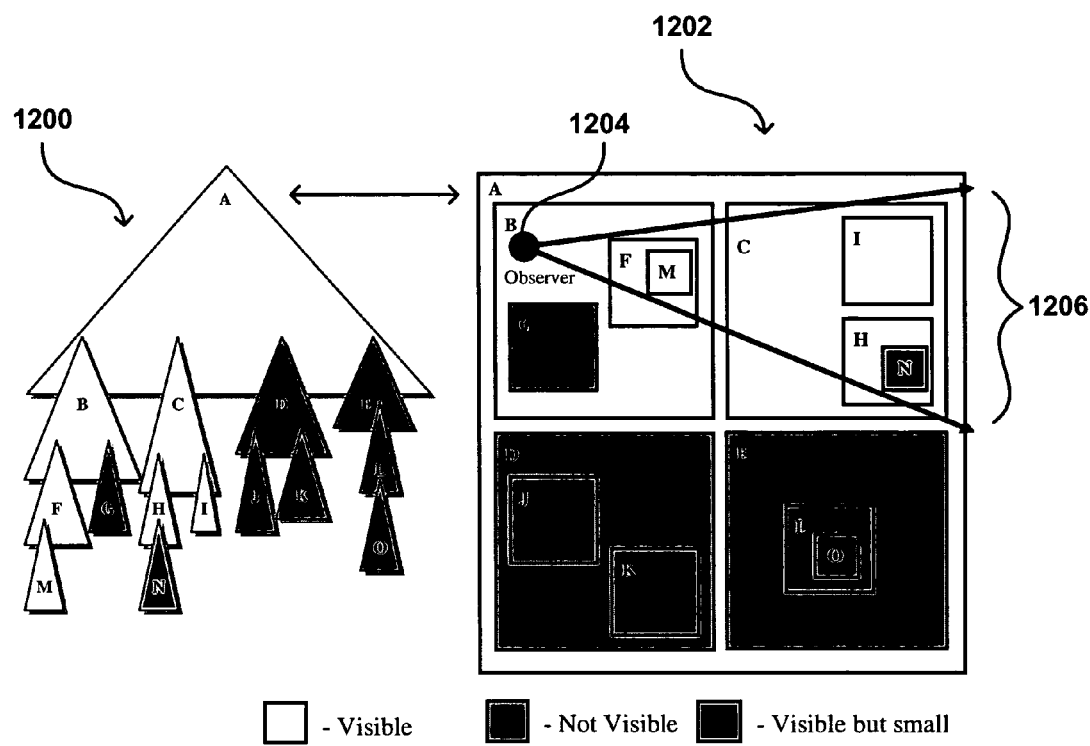
FIG. 12 is a diagram showing a view query in accordance with one embodiment of the present invention.

FIG. 12 shows an example of such a processing approach. A block diagram shows the tree structure 1200 of a point set, with a symbolic view 1202 of the same point set depicting the regions of space spanned by points in each block. An "observer" 1204 of the scene is positioned inside the volume spanned by block B, looking to the right in the figure. All point blocks that intersect the view frustum 1206 (as shown by the two dark arrows) are considered for the view. Proceeding recursively from the root A, each block is considered for the view. A view frustum query processing the blocks would find blocks A, B, F, M, C, H, and I to be visible. Blocks G, D, and E can be rejected because these blocks do not intersect the view frustum 1206. Blocks J, K, L and O need not be considered at all, because their respective parent blocks were rejected. Block N is shown to be visible and therefore not rejected by the view frustum, but can be rejected for being too small in the projection. The size of block N may not be any smaller than the size of block M, but the location of block N further from the observer can decrease its importance in the overall view as block N occupies a smaller percentage of the viewable area.

Each spatial block passing all of these tests can be assigned an importance and a tree level to be loaded if the block is selected for display. While many possible importance functions can be used to assign a weight to a passing block and select a level within the block, the importance in this example is computed from the projected screen area of the true bounding box of the spatial block, as well as the size of the minimal level whose bounding box error projects to sub-pixel error on the viewport, which is selected as the level to be loaded. Once this traversal is complete, a set of candidate blocks and their weights is determined and made available. The set can be sorted by weight with blocks of highest weight being selected from the set. The sizes of those selected blocks at the selected level can be tallied until the point where the addition of another block would cause the tally of selected samples to exceed the maximum number of points to be drawn in the scene. The desired set of selected blocks then can be set and ready to be loaded.

At this point, the desired set can be checked against several other sets of blocks already being tracked by the system. The set of blocks currently being drawn and the set of blocks in the loading queue can be adjusted by comparing the desired set to the currently loaded set. This comparison can be done as specified by the central block cache, described elsewhere herein. In one example, the desired set is compared against the set of blocks currently being drawn, the set of blocks currently loaded, and the set of blocks in the loading queue. Any blocks currently being drawn that are not in the desired set can be removed from the set currently being drawn. Any blocks that are in the desired set and also in the currently loaded set, but that are not in the set of blocks being drawn, can be added to the set of blocks being drawn.

Spatial blocks that are in the loading queue, due to a view query, may belong to the desired set and can be added to the set of blocks being drawn later, during the loading process. A problem can arise, however, in that a user might alter the view during the loading process. Changing the view during an active loading process can cause the process to restart, to the point of generating a new view query. Restarting can change the desired set of blocks, whether or not the previous view query has been completed. The newly desired set can be compared against the set of blocks currently in the loading queue. Blocks that are currently in the loading queue do not need to be reloaded. Blocks in the loading queue that are not currently in the desired set can be removed from the loading queue. Blocks that are in the desired set but that are not loaded or in the loading queue can be added to the loading queue. This approach allows interactivity to be maintained even during the loading process, whereby the user is never required to wait for loads to complete.

Query Processing and Applications

In addition to view queries, a processing system in accordance with various embodiments of the present invention can support a number of other general queries. These general queries can specify a region of the database through one or more geometric bounds, each of which is commonly a locus of points around a geometric entity. In addition to the geometric constraints, the query can specify a list of subsets to which the query should be confined. Such a query will only consider points in spatial blocks that belong to one or more of the specified subsets. Another query can specify a maximum spatial density of points to be returned. Since each level of the spatial organization represents a certain density of points, this can correspond to a level limit in the spatial tree.

Another general query can specify a maximum number of points to be returned. If the query would have returned more points based solely on the geometric, subset, and density restrictions, this restriction can limit the return points to the first level of the global spatial tree that, with the other constraints applied, returns less than the specified maximum number of points. Another general query can specify one or more filters on auxiliary data, such as a limit on intensity range for samples with intensity data, or a limit on normal direction for normal data. There can be an infinite set of possible filters, given that there is an infinite set of possible types of auxiliary data that can be associated with the samples.

For example, a ray query can be used to select points from views. The geometric entity in this case can be a cylinder for an orthographic pick, or a cone for a perspective pick. The locus of points then can be the set of points inside the cylinder or cone, plus the view plane as a half-space.

A slice query can be most useful as a constraint or portion of another query. A slice query can describe a volume of space bounded by two parallel planes facing each other, such as the region between the near and far clip planes in the view. A slice can be used instead of a pair of planes, since containment tests can be performed with a single plane distance test instead of two.

In a bounding box query, an axially aligned bounding box in an untransformed space can be tested very quickly against most spatial structures, including an octree structure. If the box is rotated relative to the space, however, the tests can become more complicated. A box query can be performed as the intersection of three slices, which can be maintained in the rotated coordinate system to minimize transformation computation.

An interference query can be used to find all points within a given distance of an arbitrary geometric object, where the object can respond to a point distance query. This query can proceed in tree order, using the distance test results to fully include or reject subtrees. Because the input geometry can be arbitrary and unknown, the output can be represented as an enumeration rather than a geometric expression.

One of the most beneficial applications of the limited density query involves the registration of multiple point sets. In this case, the registration process can utilize a sub-sampling of the point set that is evenly distributed across the surface of each point cloud. A density limited query allows sub-sampling to be done directly. The point set can be queried without geometric constraint, but with a total number of points constraint (such as a few million points). Such a query can efficiently provide an evenly sampled representation of the point set that is a fixed size, allowing the registration process to match between different scans. In this way, even very large sets can be registered together by processing query set results in memory. A further performance optimization of the registration process comes from the fact that gross overlaps between point sets can be identified very quickly by comparing the bounds of their spatial blocks to identify spatial blocks that contain potentially overlapping points. Since identifying overlapping points is a fundamental operation in registration, substantial speed gains can be realized with this method.

Reduced density queries also can be useful in contexts where the operator being applied to the data may not be able to handle the density of data present in the selected volume. A "standard" density limit can be applied to data queries when the query does not specify a limit, thereby providing a limit on the mass of point data provided to a function that asks for an enumeration of all of the data present in a user selection. The set of points returned then is not only limited in size, but can also be a spatially-even decomposition of that set of points. Thus, the operation can be prevented from receiving more data than the operation can handle, and can be provided with an even and representative sample of the data requested. This approach can be applied to such operations as meshing, where a standard mesh operator can only handle a few million points. When a standard point query is performed in accordance with embodiments of the present invention, an evenly spaced sub-sampling of the data down to a few million points can be provided to the meshing code, resulting in a plausible and accurate result. This safety limit in processing can apply to all point data processing applications that do not specifically account for very large clouds.

Once sampled points are placed into a basic data structure, or registered point sets are combined into an instance of a basic data structure, users often will need to partition sections of the structure semantically. For example, the user might take a set of LIDAR scans inside a processing plant with a number of pipes running through the area. From each viewpoint, only one side (less than 180 degrees) of each pipe will be visible. After registering the data, it would be desirable for the user to extract the sample data corresponding to each pipe. In a traditional system, the registered points would be in the same coordinate system, but would still be separated by scan location. For a pipe that was seen from n scans, then, the user would have to perform n cuts and one merge operation to create an entity corresponding to the sample points for the pipe. Utilizing embodiments of the present invention, however, the user would have unified the data into one field after registration, such that only one partition operation would be required to achieve the same result. This is possible because all of the data from each of the scan locations would be considered one single data set. Further, the data for the pipe would be contiguous and properly registered in space, such that the pipe can easily be cut from the rest of the data.

Figure 13:
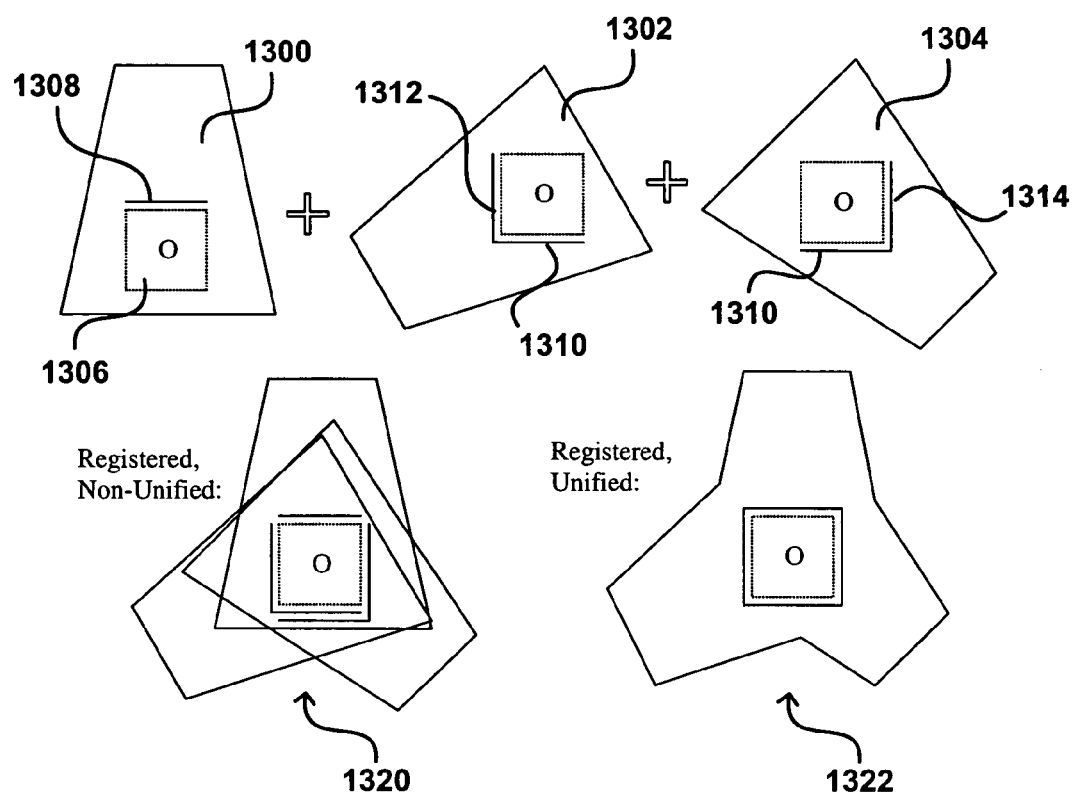
FIG. 13 is a diagram showing the unification of registered data sets in accordance with one embodiment of the present invention.

FIG. 13 shows an example of the unification of registered LIDAR scans 1300, 1302, 1304 taken from three different viewpoints. Before unification, a building 1306 being scanned has separate components (sides 1308, 1310, 1312, and 1314 in this case) that are not all visible in one scan, but can be seen in at least one of the three scans. For registered but non-unified data 1320 as in existing systems, each of the three scans would need to be separately partitioned. If the data is unified after registration to form a single coherent data set 1322, the points corresponding to the building reside in a single set that can easily be partitioned in a single operation.

Such a reduction in partitioning can be beneficial, especially for very large data sets. Partitioning point data sets in existing software typically is done via a fencing operation, where the user draws a fence on the viewport for a given view and the software separates out those points which fall within that fence on the screen. To do this, the data which falls within the fence must be enumerated. In a naïve implementation such as known in the previous art, such an operation requires memory proportional to the size of the point set object being partitioned, which is one reason why existing systems cannot unify all of the points from all of the scan locations for large sample sets. The need to enumerate the data implies memory and time consumption that can grow arbitrarily with increasingly large point sets, even if the partition operation is a relatively simple one.

Figure 14:
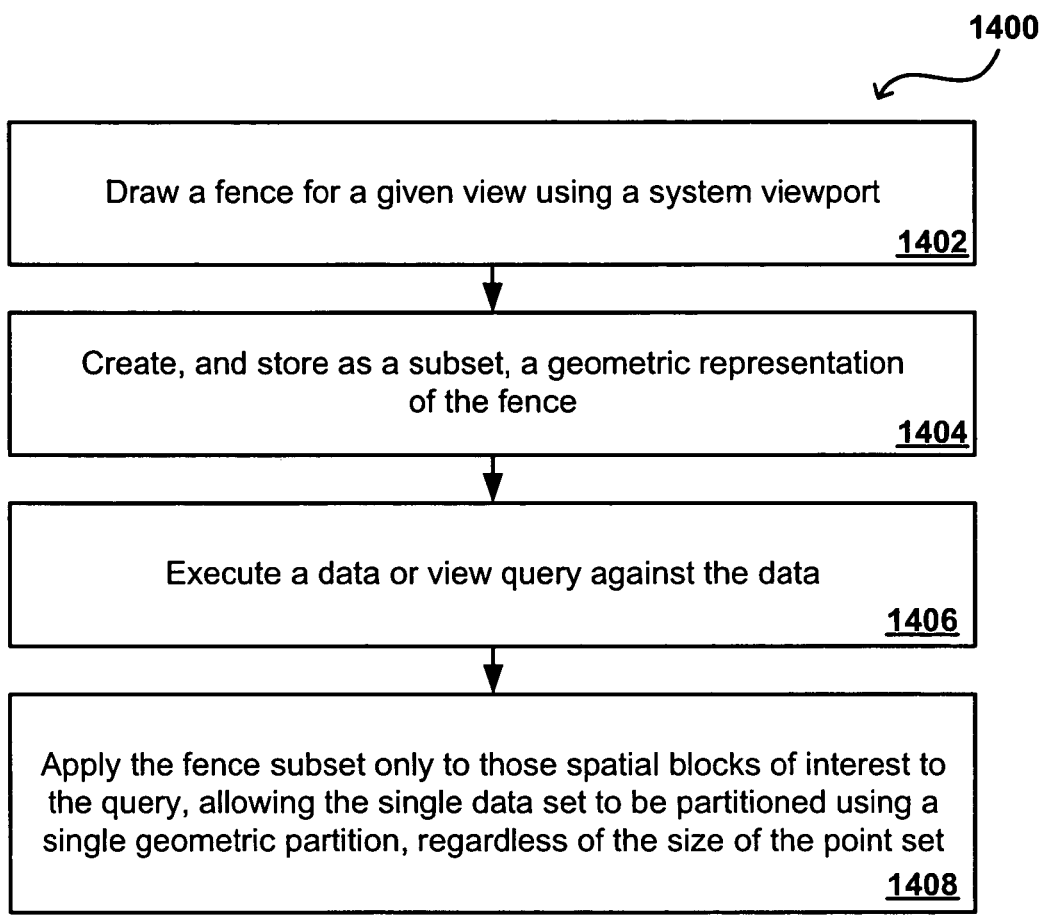
FIG. 14 is a flowchart showing steps of a data partitioning process in accordance with one embodiment of the present invention.

An improved approach 1400 in accordance with embodiments of the present invention stores the constraints themselves, as shown in the flowchart of FIG. 14. In the case of the fence operation, for example, the user will draw a fence using a system viewport 1402. A geometric representation of the fence can be created and stored as a subset 1404. The user or system then can execute any of a number of data queries or view queries 1406. The fence subset then can be applied only to those spatial blocks that are of interest to the given query or view, which can be limited by the maximum point limits on both types of query 1408. Thus, a partition of a point set can be performed in essentially constant time and using a single partition and a small amount of memory, regardless of the size of the point set being partitioned 1410. This allows the system as a whole to support arbitrarily large point sets while allowing full partitioning functionality, which is efficient to use in both time and space.

It often can be necessary to partition the surfaces of an element from a 3D cloud that has other elements in front of, behind, or at least partially obstructing or obstructed by the element in question, from any possible view the user might take. In existing systems, the user must make several cuts in order to partition such a set of points from the remainder of the point set, resulting in several undesired fragments of the point set that must be merged back into the original. This process can consume additional time and space in constructing the fragments and intermediate subsets.

Systems and methods in accordance with embodiments of the present invention can allow the user to have a dynamic "active set," which can be managed with a set of simple commands. While a number of commands can be used, one command allows a user to define a "fence" to describe a 3D geometric region. Another command allows the user to add the points inside the fence, whereby any points inside the fence are added to the active set if not there already. A command to remove the points inside a fence removes all points inside the fence from the active set. Another command allows a user to add the points outside a fence, whereby any points outside the fence are added to the active set if not there already. Another command allows a user to remove the points outside a fence such that any points outside the fence are removed from the active set.

Successive application of these commands from different viewpoints, using different fences, allows the user to build up a precise subset the user wishes to cut, without actually performing any cutting operations. Once the active set corresponds to the desired cut, the user can apply a "segment active set" operation to partition the active set from the remainder of the point sets. This approach provides more efficient workflow by eliminating intermediate cuts and point set fragments from the process.

Shared Memory Representations and Loading

It often may be the case that different viewports, as well as different queries from various threads, will be operating simultaneously on similar sections of a data set. For example, a user may have several views open that show the same scene from different angles. When queries are launched, these queries might be launched from a viewport that is drawing the same spatial blocks to be used in the query. An example of the latter is a ray picking query, which uses blocks that are visible in the viewport used for the pick. In one embodiment, a single cache which can include spatial blocks is shared by all threads of operation and all viewports. All queries with overlapping blocks then need only cause a single load action for any shared blocks. Shared blocks can be reference counted for safety between threads.

Intelligent cache management allows recently-used blocks to be retained until the memory those blocks occupy is needed for another purpose. The blocks are not simply discarded when they are not directly referenced by an active process. This cache behavior can be particularly useful for view queries, since a user often will move a view such that some spatial blocks become invisible for a moment, then become visible again. The cache allows the system to avoid additional database activity in these situations.

Along with a shared cache of blocks, all block loading can be performed through a single loading thread. Client queries can issue prioritized requests for blocks, with view queries using a priority related to the displayed area and density of the block. Other queries can use a value greater than the maximum value returned by a view query so those queries will be serviced before any view queries. These requests can be placed in a pool of pending load requests from which a load thread can continuously extract the highest priority requests and can service those requests in batches. The number of simultaneously processed queries can be a user-selectable option. In one embodiment the default is twenty blocks loaded at once. Batching of the loads can result in improved database performance, as the load overhead is amortized over multiple blocks. Further, a block is never loaded more than once, even if that block is requested by multiple queries at the same time, since there is only one load thread through which all requests travel.

It should be recognized that a number of variations of the above-identified embodiments will be obvious to one of ordinary skill in the art in view of the foregoing description.

Accordingly, the invention is not to be limited by those specific embodiments and methods of the present invention shown and described herein. Rather, the scope of the invention is to be defined by the following claims and their equivalents.

What is claimed is:

1. A memory for storing data for access by an application program being executed on a data processing system, comprising:
   a data structure stored in said memory, said data structure including information resident in a database used by said application program and including:
   a plurality of spatial block data objects, each spatial block data object representing a spatially indexed partitioning of a data set, each spatial block data object containing a set of data arrays storing point data from the data set, as well as corresponding organizational structure information and any auxiliary information; and
   a point set spatial tree data object formed of the plurality of spatial block data objects at a number of body layers, the spatial tree data object growing from a global root block data object using the organizational structure information for the spatial block data objects.

2. A memory according to claim 1, wherein:
   the data structure further includes a plurality of header block data objects in the point set spatial tree.

3. A memory according to claim 1, wherein:
   the data of the data set includes three-dimensional point data.

4. A memory according to claim 1, wherein:
   the body layers are indexed spatially by at least one of density and region of space.

5. A memory according to claim 1, wherein:
   each body layer represents a cross section of data at a predetermined density.

6. A memory according to claim 1, wherein:
   the point set spatial tree data object is an octree data structure.

7. A memory according to claim 1, wherein:
   each of the plurality of data arrays is a linear data array of the same size, with one field and one structural element per point.

8. A memory according to claim 7, wherein:
   the linear data arrays within a spatial block are partitioned into segments, each segment containing a portion of the data array that corresponds exactly to one or more body layers.

9. A memory according to claim 1, wherein:
   information stored for each point of the data set includes information selected from the group consisting of index information about a parent sample within the spatial block, index information about a first child sample within the spatial block, a flag field indicating whether a point sample represents a last sub-sample of a parent in the data array, a flag field indicating whether there are subfields within other spatial blocks, and a flag indicating whether another spatial block is rooted at the location of a point sample.

10. A memory according to claim 1, wherein:
    each spatial block stores pieces of information selected from the group consisting of references to any child spatial blocks, the sizes of each body layer from a root of the spatial block down to an end of the spatial block, a bounding region of a root sample of the spatial block, a bounding region specifying a bound of a subtree of samples rooted at a root of the spatial block, a spatial resolution of each layer of the spatial tree, the resolutions of each layer from the root of the spatial block to the bottom of the spatial tree, a reference to a parent spatial block of the spatial block, and at least one header block referring to a root spatial block of the spatial tree.

11. A memory according to claim 10, wherein:
the data structure further includes at least one data subset of the point set.

12. A memory according to claim 11, wherein:
the subset is a mathematical or geometric combination of one or more of a filtered subset, an enumerated subset, and a composite subset.

13. A memory according to claim 12, wherein:
the mathematical or geometric combination includes unions, intersections, and negations.

14. A memory according to claim 13, wherein:
at least one of the at least one data subset includes an individual expression capable of being simplified to reduce complexity.

15. A memory according to claim 14, wherein:
the simplification to reduce complexity uses at least one of the point data, mathematical properties of the individual expression, and geometric properties of the individual expression.

16. A memory according to claim 11, wherein:
the point subset is represented in the data structure by an expression tree, internal nodes of the expression tree including expressions for combining subsets.

17. A memory according to claim 11, wherein:
each of the at least one data subset includes contents and properties that are evaluated when that subset is evaluated, rather than when that subset is defined.

18. A memory according to claim 11, wherein:
each of the at least one data subset comprises an expression tree, and a plurality of the at least one data subset are combinable into an aggregate subset that comprises an aggregate expression tree.

19. A memory according to claim 17, wherein:
the combination into an aggregate subset is performed by at least one of a union, an intersection, and a negation of individual expressions of the at least one data subset.

20. A memory according to claim 11, wherein:
each of the at least one data subset is capable of being filtered using at least one filter operable to filter by one of geometric properties, intensity, color, and other auxiliary data fields associated per point.

21. A memory according to claim 12, wherein:
each filtered subsets includes at least one geometric filter selected from the group consisting of cones, spheres, cylinders, slices, torii, axis aligned boxes, non axis aligned boxes, polygonal fences, half-spaces, parallel planes, caps, and vectors.

22. A memory according to claim 11, wherein:
the at least one data subset is built up interactively from multiple independent operations that are capable of adding constraints to, and removing constraints from, the subset before committing the subset to the memory.

23. A method of organizing and storing point data, comprising the steps of:
obtaining a set of related point data;
sorting the related point data by at least one of spatial density and region of space;
partitioning the sorted point data into separately addressable blocks of data;
organizing the separately addressable blocks by at least one of spatial density and region of space; and
stitching related separately addressable blocks together to form a single global data tree.

24. A method according to claim 23, further comprising:
storing the set of related point data to an external storage medium, whereby the related point data can be sorted from the external storage medium.

25. A method according to claim 23, further comprising:
writing the separately addressable blocks to a database.

26. A method according to claim 23, wherein:
sorting the related point data includes writing the point data to a linear array.

27. A method according to claim 26, further comprising:
allocating an organizational array to contain organizational structure information for the respective linear array.

28. A method according to claim 27, wherein:
the organizational array organizes the set of related point data by at least one of spatial density and region of space.

29. A method according to claim 27, wherein:
partitioning the sorted point data into separately addressable blocks of data uses the organizational structure information partition the linear array into blocks.

30. A method according to claim 1, further comprising:
organizing each separately addressable block by at least one of spatial density and region of space.

31. A method according to claim 1, wherein:
at least one of the sorting, partitioning, organizing, and stitching steps can be executed at least partially during the step of obtaining the set of related point data.

32. A method according to claim 1, wherein:
obtaining a set of related point data includes taking a scan of a physical object.

33. A method according to claim 1, further comprising:
obtaining auxiliary information for the set of related point data.

34. A method according to claim 33, further comprising:
associating at least one auxiliary data field with each data point in the set of related point data.

35. A method according to claim 34, further comprising:
maintaining the association between each at least one auxiliary data field and the respective data point until the data tree is formed.

36. A method according to claim 35, further comprising:
writing the separately addressable blocks to a database to form a single queryable instance of a data structure for the point data with auxiliary data.

37. A method according to claim 36, wherein:
the single queryable instance is formed regardless of the size of the set of point data.

38. A method of querying a point data set consisting of a global data tree of separately addressable blocks, comprising the steps of:
specifying a spatial area of the point data set;
specifying a maximum number of data points to be returned;
specifying whether to return auxiliary data associated with points in the data set; and
receiving a subset of the point data set corresponding to the spatial area, the subset having a number of points at most equal to the maximum number, the subset further including any specified per-point auxiliary data corresponding to data points in the subset.

39. A method according to claim 38, further comprising:
specifying a maximum resolution, such that the subset will include data points of a density at most equal to the maximum resolution.

40. A method according to claim 39, wherein:
the subset represents a spatial downsampling of the set of related point data over the specified spatial area.

41. A method of querying a point data set, comprising the steps of:
- allowing a user to specify a spatial area of the point data set;
- allowing a user to specify a maximum number of data points to be returned;
- allowing a user to specify whether to return auxiliary data associated with points in the data set;
- formulating a query based on the spatial area, maximum number, and auxiliary data specification and running that query against a database;
- receiving from the database a subset of the point data set corresponding to the spatial area, the subset having a number of points at most equal to the maximum number, the subset further including any per-point auxiliary data corresponding to data points in the subset; and
- at least one of displaying the subset and writing the subset to a database.

42. A method of registering multiple data sets, comprising the steps of:
- obtaining a plurality of data sets, each data set including separately addressable blocks stitched together to form a single data tree;
- running a series of queries against the plurality of data sets, each query specifying a spatial area and maximum number of points;
- using results from the series of queries to relate the data sets together; and
- organizing the related data sets to form a single global data tree.

43. A method according to claim 42, wherein:
obtaining a plurality of data sets includes obtaining a set of related point data for each data set, sorting the related point data by at least one of spatial density and region of space, partitioning the sorted point data into separately addressable blocks of data, organizing the separately addressable blocks by at least one of spatial density and region of space, and stitching related separately addressable blocks together to form a single data tree.

44. A method according to claim 42, wherein:
organizing the related data sets includes sorting point data in the related data sets by at least one of spatial density and region of space, partitioning the sorted point data into separately addressable blocks of data, organizing the separately addressable blocks by at least one of spatial density and region of space, and stitching related separately addressable blocks together to form a single global data tree.

45. A method according to claim 42, wherein:
using results from the series of queries to relate the data sets together produces a single registered set of data.

46. A method according to claim 42, wherein:
obtaining the plurality of related data sets includes taking a plurality of scans of a physical object, each scan corresponding to a related data set.

* * * * *

UNITED STATES PATENT AND TRADEMARK OFFICE
CERTIFICATE OF CORRECTION

PATENT NO. : 7,373,473 B2 Page 1 of 4
APPLICATION NO. : 11/076220
DATED : May 9, 2005
INVENTOR(S) : Bukowski et al.

It is certified that error appears in the above-identified patent and that said Letters Patent is hereby corrected as shown below:

Drawings
Sheet 3, replace FIG. 3 with the figure depicted herein below, wherein the vertical slices mentioned in column 8 are labeled --306--

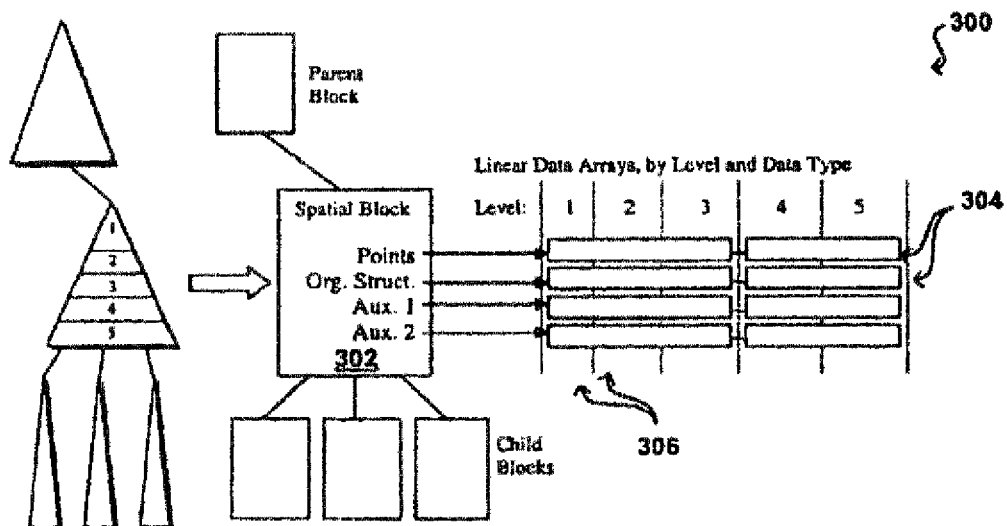

FIG. 3

UNITED STATES PATENT AND TRADEMARK OFFICE
CERTIFICATE OF CORRECTION

PATENT NO. : 7,373,473 B2
APPLICATION NO. : 11/076220
DATED : May 9, 2005
INVENTOR(S) : Bukowski et al.

It is certified that error appears in the above-identified patent and that said Letters Patent is hereby corrected as shown below:

Sheet 5, replace the top portion of FIG. 6 with the top portion of the figure depicted herein below, wherein the number "604", which is never mentioned, is removed

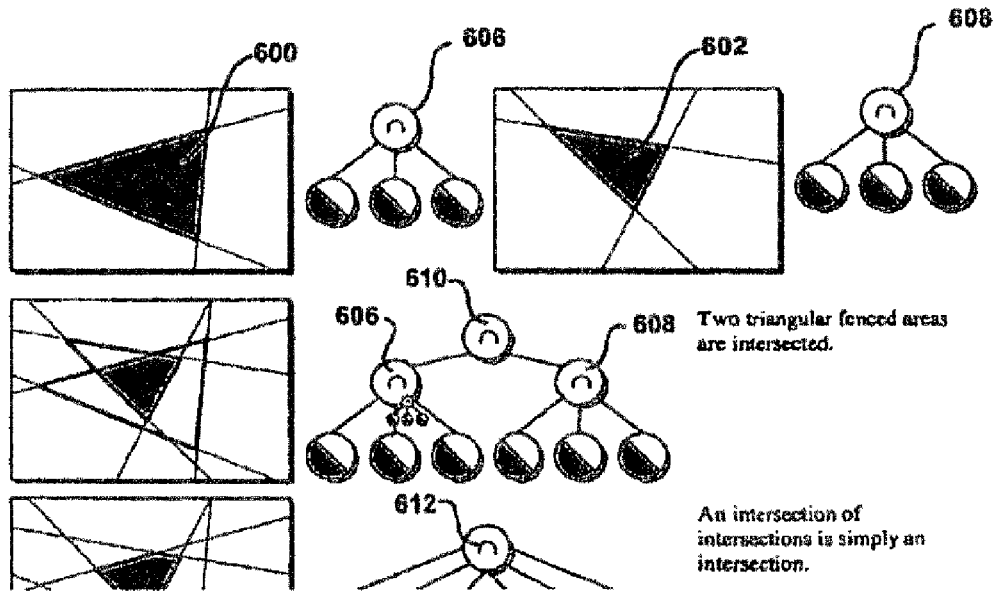

UNITED STATES PATENT AND TRADEMARK OFFICE
CERTIFICATE OF CORRECTION

PATENT NO.       : 7,373,473 B2
APPLICATION NO.  : 11/076220
DATED            : May 9, 2005
INVENTOR(S)      : Bukowski et al.

Figure 8:
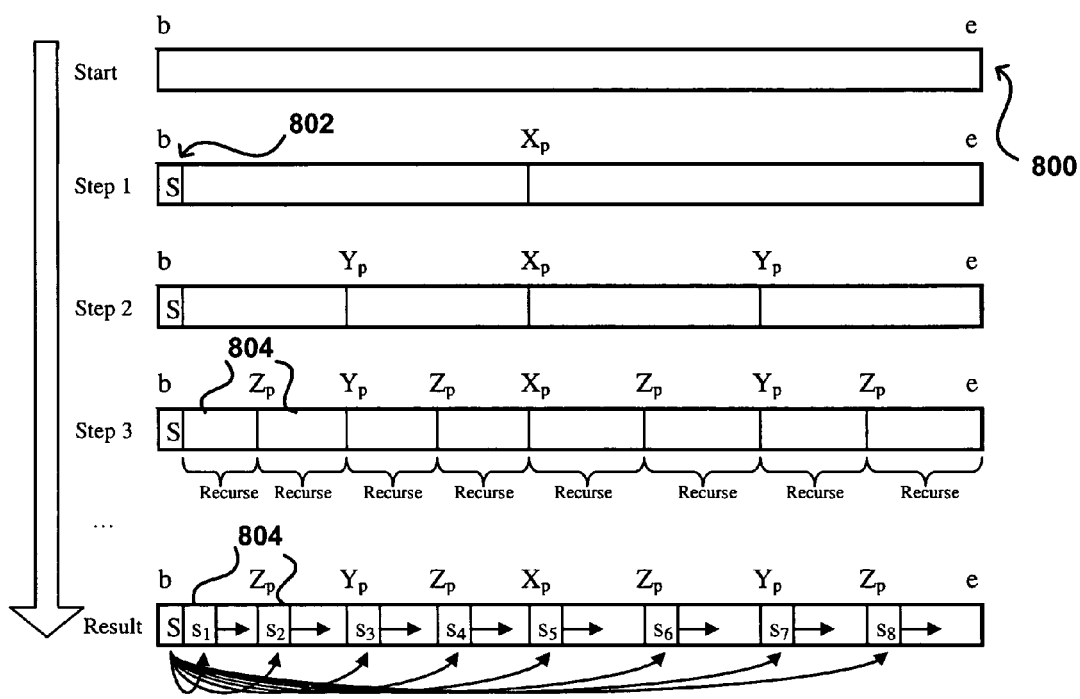
FIG. 8 is a diagram showing an intermediate recursive step in the partitioning phase of a construction algorithm in accordance with one embodiment of the present invention.

It is certified that error appears in the above-identified patent and that said Letters Patent is hereby corrected as shown below:

Sheet 7, replace FIG. 8 with the figure depicted below, wherein the sub-segment head elements have been labeled --806--

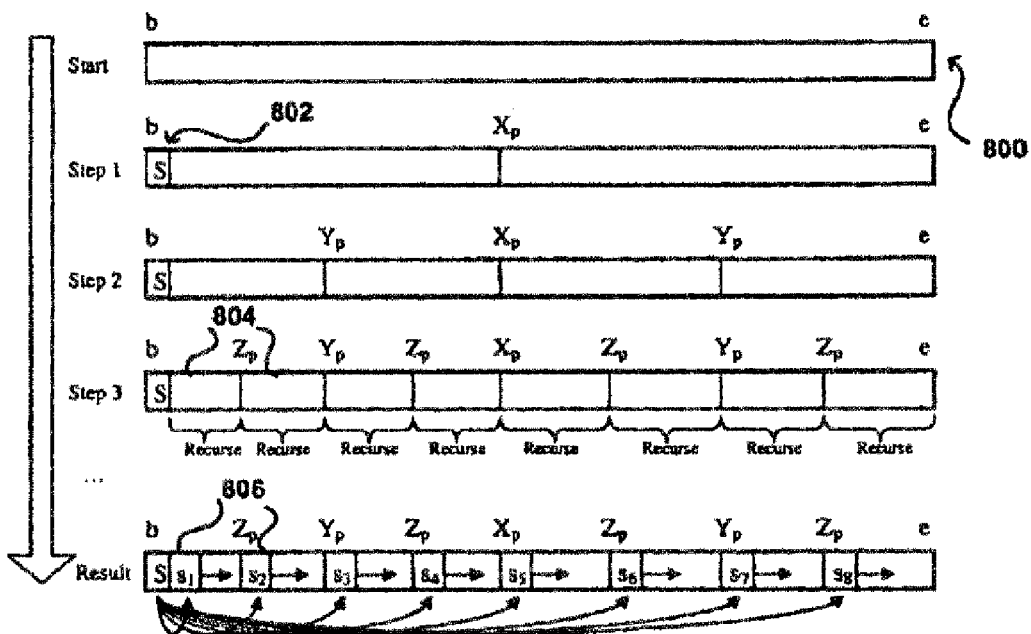

FIG. 8

UNITED STATES PATENT AND TRADEMARK OFFICE
CERTIFICATE OF CORRECTION

PATENT NO.       : 7,373,473 B2
APPLICATION NO.  : 11/076220
DATED            : May 9, 2005
INVENTOR(S)      : Bukowski et al.

It is certified that error appears in the above-identified patent and that said Letters Patent is hereby corrected as shown below:

Column 4
Line 19, change "for" to --of--
Line 20, change "for" to --of--
Line 33, remove "(a)"
Line 34, remove "(b)"

Column 13
Line 31, change "710" to --710--

Column 15
Line 11, change "can" to --should--

Column 17
Line 12, change "FIG. 7" to --FIG. 9--

Column 22
Line 51, change "1410" to --1408--

Column 26
Line 24, change "A method according to claim 1," to --A method according to claim 23,--
Line 27, change "A method according to claim 1," to --A method according to claim 23,--
Line 31, change "A method according to claim 1," to --A method according to claim 23,--
Line 34, change "A method according to claim 1," to --A method according to claim 23,--

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,373,473 B2  Page 1 of 4
APPLICATION NO. : 11/076220
DATED : May 13, 2008
INVENTOR(S) : Bukowski et al.

It is certified that error appears in the above-identified patent and that said Letters Patent is hereby corrected as shown below:

Drawings
Sheet 3, replace FIG. 3 with the figure depicted herein below, wherein the vertical slices mentioned in column 8 are labeled --306--

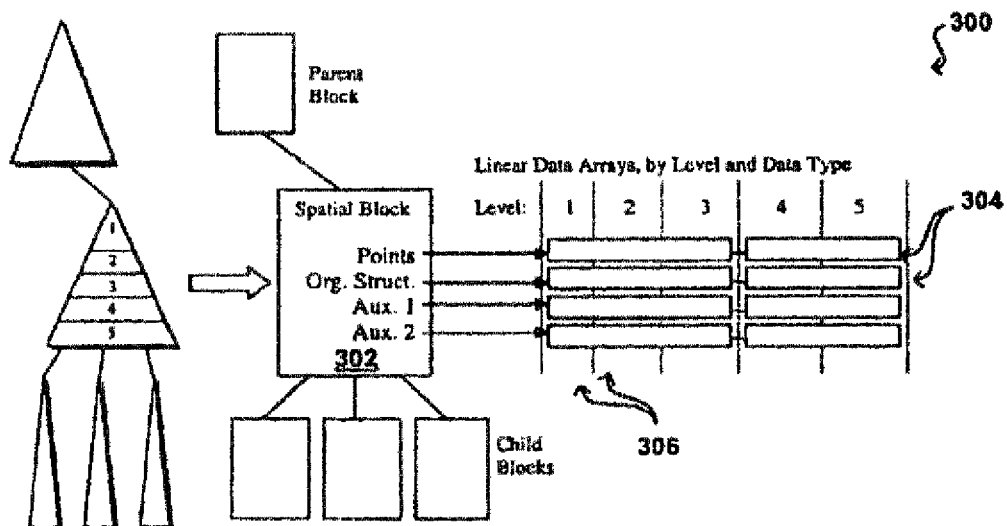

FIG. 3

UNITED STATES PATENT AND TRADEMARK OFFICE
CERTIFICATE OF CORRECTION

PATENT NO.         : 7,373,473 B2                                      Page 2 of 4
APPLICATION NO. : 11/076220
DATED              : May 13, 2008
INVENTOR(S)        : Bukowski et al.

It is certified that error appears in the above-identified patent and that said Letters Patent is hereby corrected as shown below:

Sheet 5, replace the top portion of FIG. 6 with the top portion of the figure depicted herein below, wherein the number "604", which is never mentioned, is removed

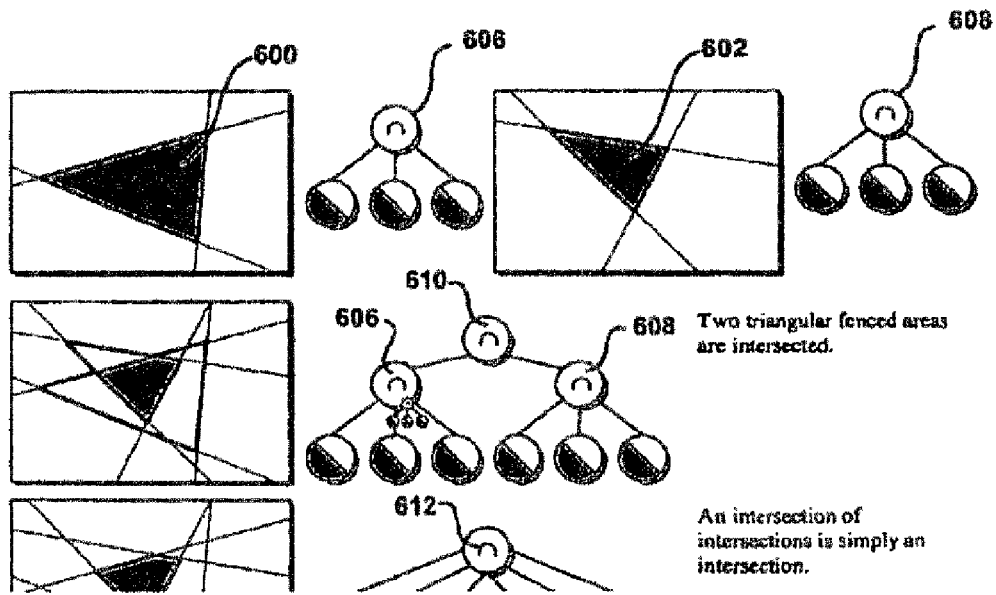

UNITED STATES PATENT AND TRADEMARK OFFICE
CERTIFICATE OF CORRECTION

PATENT NO.        : 7,373,473 B2                                Page 3 of 4
APPLICATION NO.   : 11/076220
DATED             : May 13, 2008
INVENTOR(S)       : Bukowski et al.

It is certified that error appears in the above-identified patent and that said Letters Patent is hereby corrected as shown below:

Sheet 7, replace FIG. 8 with the figure depicted below, wherein the sub-segment head elements have been labeled --806--

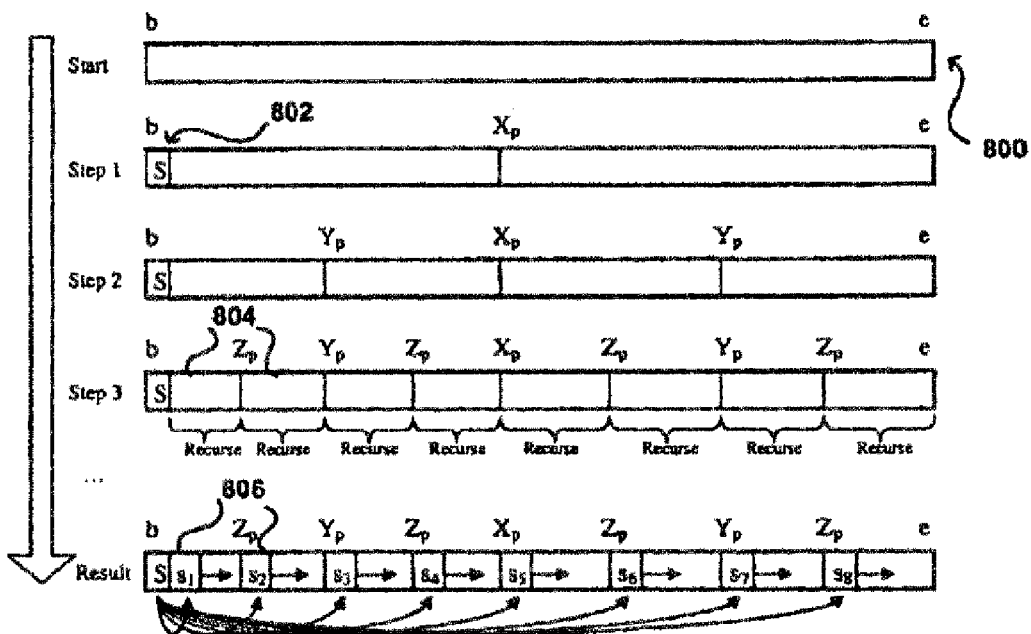

FIG. 8

UNITED STATES PATENT AND TRADEMARK OFFICE
CERTIFICATE OF CORRECTION

PATENT NO. : 7,373,473 B2  Page 4 of 4
APPLICATION NO. : 11/076220
DATED : May 13, 2008
INVENTOR(S) : Bukowski et al.

It is certified that error appears in the above-identified patent and that said Letters Patent is hereby corrected as shown below:

Column 4
Line 19, change "for" to --of--
Line 20, change "for" to --of--
Line 33, remove "(a)"
Line 34, remove "(b)"

Column 13
Line 31, change "710" to --710--

Column 15
Line 11, change "can" to --should--

Column 17
Line 12, change "FIG. 7" to --FIG. 9--

Column 22
Line 51, change "1410" to --1408--

Column 26
Line 24, change "A method according to claim 1," to --A method according to claim 23,--
Line 27, change "A method according to claim 1," to --A method according to claim 23,--
Line 31, change "A method according to claim 1," to --A method according to claim 23,--
Line 34, change "A method according to claim 1," to --A method according to claim 23,--

This certificate supersedes the Certificate of Correction issued June 30, 2009.

Signed and Sealed this

Twenty-eighth Day of July, 2009

JOHN DOLL
*Acting Director of the United States Patent and Trademark Office*